United States Patent
Usami et al.

(10) Patent No.: US 11,212,613 B2
(45) Date of Patent: Dec. 28, 2021

(54) SIGNAL PROCESSING DEVICE AND SIGNAL PROCESSING METHOD

(71) Applicant: Panasonic Intellectual Property Management Co., Ltd., Osaka (JP)

(72) Inventors: Hikaru Usami, Osaka (JP); Yoshifumi Hirose, Kyoto (JP); Yusuke Adachi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/117,657

(22) Filed: Dec. 10, 2020

(65) Prior Publication Data

US 2021/0099796 A1  Apr. 1, 2021

Related U.S. Application Data

(63) Continuation of application No. PCT/JP2019/042375, filed on Oct. 29, 2019.

(30) Foreign Application Priority Data

Dec. 6, 2018  (JP) .............................. JP2018-229368

(51) Int. Cl.
*H04R 3/00* (2006.01)
*H04R 1/40* (2006.01)

(52) U.S. Cl.
CPC ............. *H04R 3/005* (2013.01); *H04R 1/406* (2013.01); *H04R 2201/401* (2013.01); *H04R 2430/23* (2013.01)

(58) Field of Classification Search
CPC .. H04R 3/005; H04R 1/406; H04R 2201/401; H04R 2430/23
See application file for complete search history.

(56) References Cited

FOREIGN PATENT DOCUMENTS

| JP | 4669150 | 4/2011 | |
|----|---------|--------|---|
| JP | 5235070 | 7/2013 | |
| WO | WO-2018193826 A1 * | 10/2018 | ........... G10L 13/047 |

OTHER PUBLICATIONS

International Search Report dated Dec. 10, 2019 in International (PCT) Application No. PCT/JP2019/042375.
English Translation of the International Preliminary Report on Patentability dated Jun. 17, 2021 in International (PCT) Application No. PCT/JP2019/042375.

* cited by examiner

*Primary Examiner* — Regina N Holder
(74) *Attorney, Agent, or Firm* — Wenderoth, Lind & Ponack L.L.P.

(57) ABSTRACT

The signal processing device is a signal processing device that collects a target sound output from an object to be a sound source, and includes a communication circuit that inputs image data produced by a camera and an acoustic signal output from a microphone array, and a control circuit that controls a sound collection direction of the acoustic signal in at least any one of a horizontal direction and a vertical direction relative to the microphone array based on at least any one of the image data and the acoustic signal.

10 Claims, 20 Drawing Sheets

SIGNAL PROCESSING DEVICE AND SIGNAL PROCESSING METHOD

CROSS-REFERENCE TO RELATED APPLICATIONS

This is a continuation application of International Application No. PCT/JP2019/042375, with an international filing date of Feb. 19, 2019, which claims priority of Japanese Patent Application No. 2018-229368 filed on Dec. 6, 2018, each of the content of which is incorporated herein by reference in its entirety.

TECHNICAL FIELD

This disclosure relates to a signal processing device and a signal processing method that each execute signal processing for an acoustic signal.

BACKGROUND ART

Japanese Patent Publication No. 5235070 discloses a sound monitoring device that executes calculation of an in-coming direction and determination of abnormality, for a sound. The sound monitoring device displays information formed by combining information on the in-coming direction of the sound and information on the abnormality of the sound with each other, superimposing the combined information on a shot image. In the case where the combined information is present outside the display range of a displaying means that displays the image thereon, the combined information is displayed at the upper end, the lower end, the left end, or the right end of the display range, that corresponds to the in-coming direction of the sound. Recognition of the in-coming direction of an abnormal sound is thereby enabled even in the case where the abnormal sound is generated outside the display range of the sound monitoring device.

Japanese Patent Publication No. 4669150 discloses a main subject estimating device that automatically executes gazing or following for a main subject to be shot, based on image information and secondary sense information such as a sound. In the case where a specific person detected using the image information and a specific person detected using the secondary sense information match with each other, the main subject estimating device estimates the position of the matched specific person based on the degree of reliability of each of the position and the detection result of the specific person detected from the image information and the degree of reliability of each of the position and the detection result of the specific person detected from the secondary sense information. Appropriate detection of the main subject to be gazed or followed is thereby enabled to continue without losing sight of the main subject.

SUMMARY

This disclosure provides a signal processing device and a signal processing method that each enable acquisition of a highly precise target sound.

In one general aspect, a signal processing device that collects a target sound output from an object to be a sound source, the signal processing device comprising an interface device that receives image data produced by a camera and an acoustic signal output from a microphone array and a control circuit that controls a sound collection direction of the acoustic signal in at least any one of a horizontal direction and a vertical direction relative to the microphone array based on at least any one of the image data and the acoustic signal, wherein the control circuit detects a predetermined marker attached to the object from the image data estimates a distance from the microphone array to the sound source based on the detected marker and corrects the target sound based on distance information indicating the estimated distance.

This comprehensive and specific aspect may be realized by a system, a method, or a computer program, or a combination thereof.

Additional benefits and advantages of the disclosed embodiments will be apparent from the specification and Figures. The benefits and/or advantages may be individually provided by the various embodiments and features of the specification and drawings, and need not all be provided in order to obtain one or more of the same.

According to the signal processing device of the above general aspect and the signal processing method of this disclosure, the collected target sound is corrected based on the distance from the microphone array to the sound source, and a highly precise target sound can therefore by acquired.

DETAILED DESCRIPTION (Finding to Be Basis of This Disclosure)

The position of an object to be a sound source has traditionally been identified in two dimensions of a horizontal direction and a vertical direction, and a target sound has traditionally been collected based on the identified position. It is however difficult to acquire a highly precise target sound in the case where the distance from a microphone array to the sound source is long. For example, for a point sound source, assuming that the distance from the sound source is r [m] and a reference distance from the sound source is r0 [m] (such as, for example, r0=1), the attenuation amount Q [dB] of the sound is "$Q=20 \times \log_{10}(r/r0)$". The attenuation amount of the sound is therefore large when the distance from the microphone array to the sound source is long. It has therefore been difficult to acquire a desired target sound using the sound collection based on the position identified in the two dimensions of the horizontal direction and the vertical direction as has traditionally been executed.

The signal processing device and the signal processing method of this disclosure each correct a target sound collected by identifying the position of an object to be a sound source, in accordance with the distance from a microphone array to the sound source. For example, the signal processing device and the signal processing method of this disclosure each estimate the distance from the microphone array to the sound source by detecting a predetermined marker attached to the object. For example, the sound volume of the collected target sound is amplified more as the distance from the microphone array to the sound source is longer. In other words, according to the signal processing device and the signal processing method of this disclosure, the target sound is acquired based on the position of the sound source identified in each of the horizontal direction and the vertical direction, and the distance to the sound source in the depth direction. A highly precise target sound can therefore be acquired.

First Embodiment

Embodiments will be described below with reference to the drawings. In this embodiment, an example where a sound of a person is collected will be described.

1. Configuration of Signal Processing Device

Figure 1:
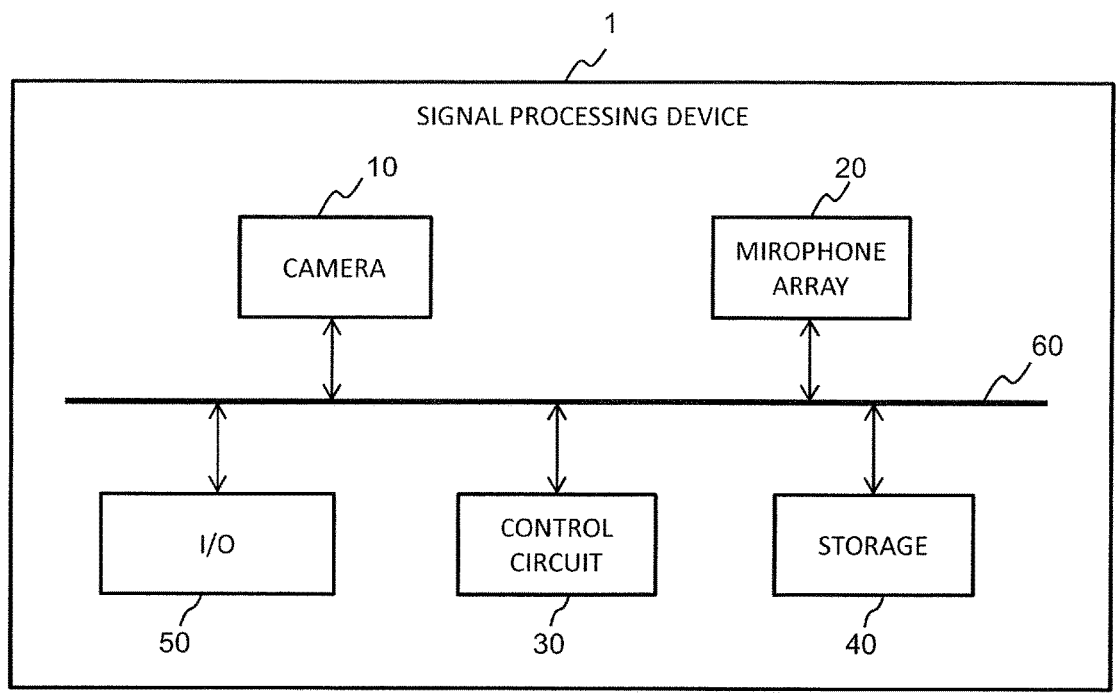
FIG. 1 is a block diagram depicting the configuration of a signal processing device of each of a first to a third embodiments.

FIG. 1 depicts the configuration of a signal processing device of this disclosure. The signal processing device 1 includes a camera 10, a microphone array 20, a control circuit 30, a storage 40, an input and output interface 50, and a bus 60. The signal processing device 1 is used in, for example, a plant and collects sounds of persons present in the plant. In this embodiment, the signal processing device 1 is a dedicated sound collecting machine that has the camera 10, the microphone array 20, the control circuit 30, the storage 40, the input and output interface 50, and the bus 60 integrated therein with each other.

The camera 10 includes an image sensor such as a CCD image sensor, a CMOS image sensor, or an NMOS image sensor. The camera 10 produces and outputs image data that is a video image signal.

The microphone array 20 includes plural microphones. The microphone array 20 receives a sound wave, converts the sound wave into an acoustic signal that is an electric signal, and outputs the acoustic signal.

The control circuit 30 determines the sound collection direction based on the image data acquired from the camera 10 and the acoustic signal acquired from the microphone array 20. The sound collection direction is the direction in which the target sound source is present. The target sound source is the sound source that outputs the target sound. In this embodiment, the target sound source is a person and a sound of a person is the target sound. The control circuit 30 executes signal processing that emphasizes a sound coming from the sound collection direction, and thereby takes out the target sound from the acoustic signal output by the microphone array 20. The control circuit 30 is a control circuit such as a microcomputer, a CPU, an MPU, a DSP, an FPGA, or an ASIC.

The storage 40 can be realized by, for example, a hard disc (an HDD), an SSD, a RAM, a DRAM, a ferroelectric memory, a flash memory, a magnetic disc, or a combination thereof. The image data acquired from the camera 10 and the acoustic signal acquired from the microphone array 20 may be stored in the storage 40.

The input and output interface 50 includes a communication circuit that executes communication with external instruments being compliant with a predetermined communication standard. The predetermined communication standard includes, for example, a LAN, Wi-Fi (a registered trademark), Bluetooth (a registered trademark), USB, or HDMI (a registered trademark).

The bus 60 is a signal line that electrically connects the camera 10, the microphone array 20, the control circuit 30, the storage 40, and the input and output interface 50 to each other.

When the control circuit 30 acquires the image data from the camera 10 or takes out the image data from the storage 40, the control circuit 30 corresponds to an input device for the image data. When the control circuit 30 acquires the acoustic signal from the microphone array 20 or takes out the acoustic signal from the storage 40, the control circuit 30 corresponds to an input device for the acoustic signal.

Figure 2:
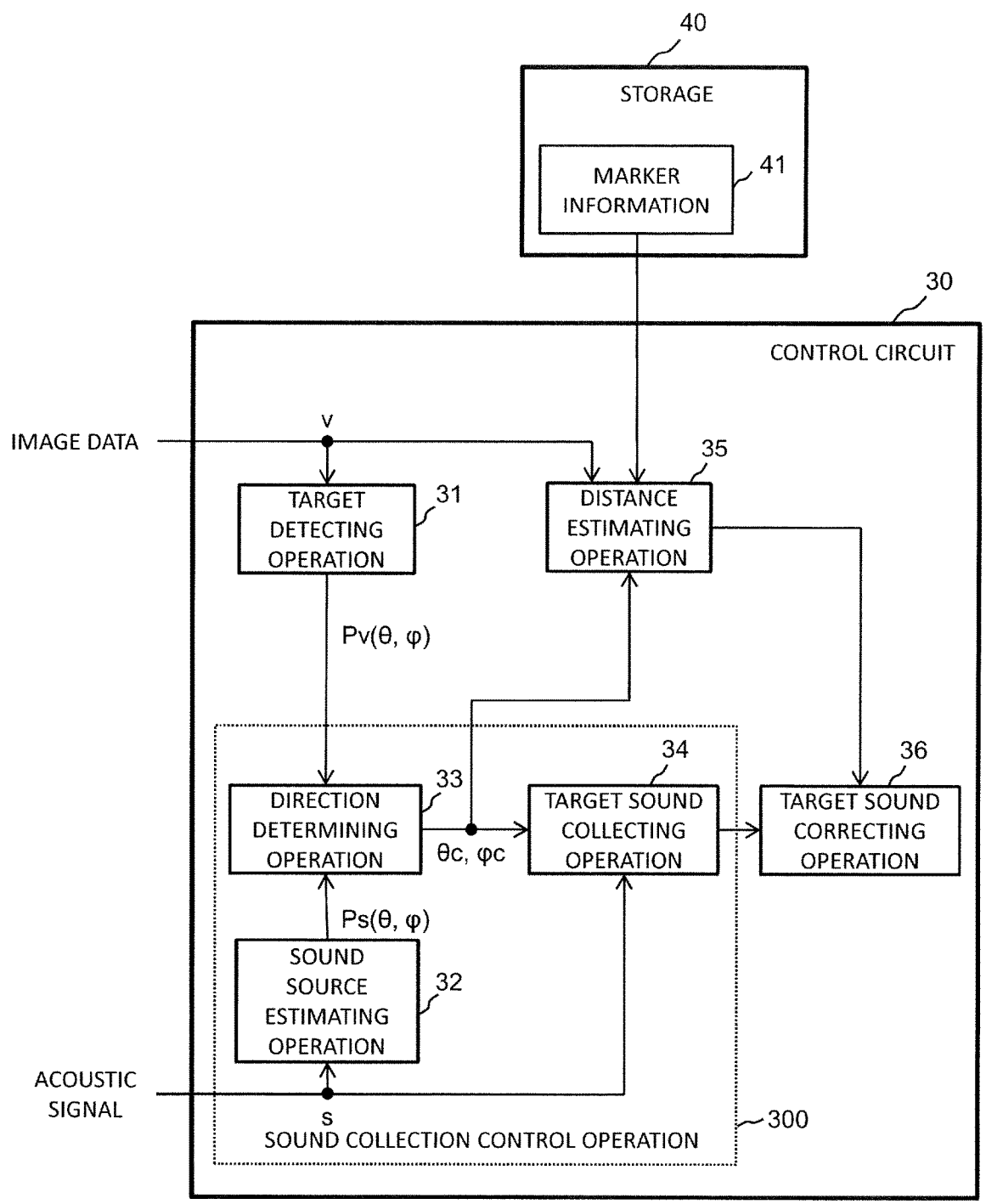
FIG. 2 is a block diagram depicting one example of functions of a control circuit of the first embodiment.

FIG. 2 depicts an exemplary configuration of the control circuit 30 in view of its operations in the first embodiment. The function of the control circuit 30 may be constituted only by hardware or may be realized by combining hardware and software with each other.

The control circuit 30 performs an target detecting operation 31, a sound source estimating operation 32, a direction determining operation 33, a target sound collecting operation 34, a distance estimating operation 35, and a target sound correcting operation 36. The sound source estimating operation 32, the direction determining operation 33, and the target sound collecting operation 34 may be integrated to constitute a sound collection control operation 300.

In the target detecting operation 31, the control circuit 30 detects a target from image data v produced by the camera 10, and outputs object position information that is information indicating the position of the detected target. The target is the whole or a portion of an object that emits a target sound. In this embodiment, the object emitting the target sound is a person and the target is the face of the person. The control circuit 30 calculates in this operation 31 probability Pv(θ,φ) for each of the images in plural determination areas r(θ,φ) in the image data v that corresponds to, for example, one frame of a moving image or one still image, to be the target. Hereinafter, the probability Pv(θ,φ) will also be referred to as "target probability". The control circuit 30 outputs in this operation 31 the target probability Pv(θ,φ) in each determination area r(θ,φ) in the image data v, as object position information. The determination area r(θ,φ) will be described later.

The control circuit 30 calculates in the sound source estimating operation 32 the position of the sound source from the acoustic signal s acquired from the microphone array 20 and thereby estimates the position of the sound source. The control circuit 30 outputs in this operation 32 sound source position information that indicates the estimated position of the sound source. For example, the control circuit 30 calculates in the sound source estimating operation 32 the probability Ps(θ,φ) for the sound source to be present in the direction identified by a horizontal angle θ and a vertical angle φ relative to the signal processing device 1. Hereinafter, the probability Ps(θ,φ) will also be referred to as "sound source probability". The control circuit 30 outputs in this operation 32 the sound source probability Ps(θ,φ) as sound source position information.

The control circuit 30 determines in the direction determining operation 33 the sound collection direction based on the target probability Pv(θ,φ) and the sound source probability Ps(θ,φ). The sound collection direction is represented by, for example, a horizontal angle θc and a vertical angle φc relative to the signal processing device 1.

The control circuit 30 executes in the target sound collecting operation 34 signal processing that emphasizes a sound coming from the sound collection direction for the acoustic signal s output by the microphone array 20, and thereby takes out the target sound from the acoustic signal s. The control circuit 30 may further execute in this operation 34 signal processing that suppresses sounds coming from directions other than the sound collection direction to collect a clear sound whose noises are reduced. In this embodiment, by performing the target sound collecting operation 34, the control circuit 30 functions as a beamforming unit that sets the beam form such that the target sound is extracted from the acoustic signal s based on the sound collection direction.

In the distance estimating operation 35, the control circuit 30 refers to marker information 41 to detect the marker from the image data v, and calculates the distance from the camera 10 to the marker based on the image size of the detected marker. The distance from the microphone array to the target sound source is thereby estimated. The control circuit 30 outputs in this operation 35 distance information that indicates the estimated distance.

The marker information 41 is stored in the storage 40. The marker information 41 includes information relating to the marker used in the measurement of the distance from the microphone array 20 to the target sound source. The marker has a predetermined size. The type(s) of the marker included in the marker information 41 may be one or may be plural. The marker information 41 includes, for example, the size of the marker and a characteristic amount of the image of the marker.

The control circuit 30 detects in the distance estimating operation 35 the marker from the image data v by, for example, collating the characteristic amount extracted from the image data v with the characteristic amount indicated by the marker information 41. The control circuit 30 estimates in this operation 35 the distance from the camera 10 to the detected marker by comparing the image size of the detected marker with the size indicated by the marker information 41. The control circuit 30 thereby estimates in this operation 35 the distance from the microphone array 20 to the target sound source. The distance estimating operation 35 may detect plural markers from the image data v and may calculate the ratios of the distances from the camera 10 to the markers based on the image sizes of the detected plural markers.

The control circuit 30 executes correction in the target sound correcting operation 36 in accordance with the distance estimated by the distance estimating operation 35 for the target sound taken out by the target sound collecting operation 34. For example, control circuit 30 includes an amplifier that amplifies a sound signal in the target sound correcting operation 36, and executes signal processing that amplifies more the sound volume of the target sound as the distance is longer. In this operation 36, the control circuit 30 may vary the frequency property of the target sound in accordance with the distance.

Figure 3:
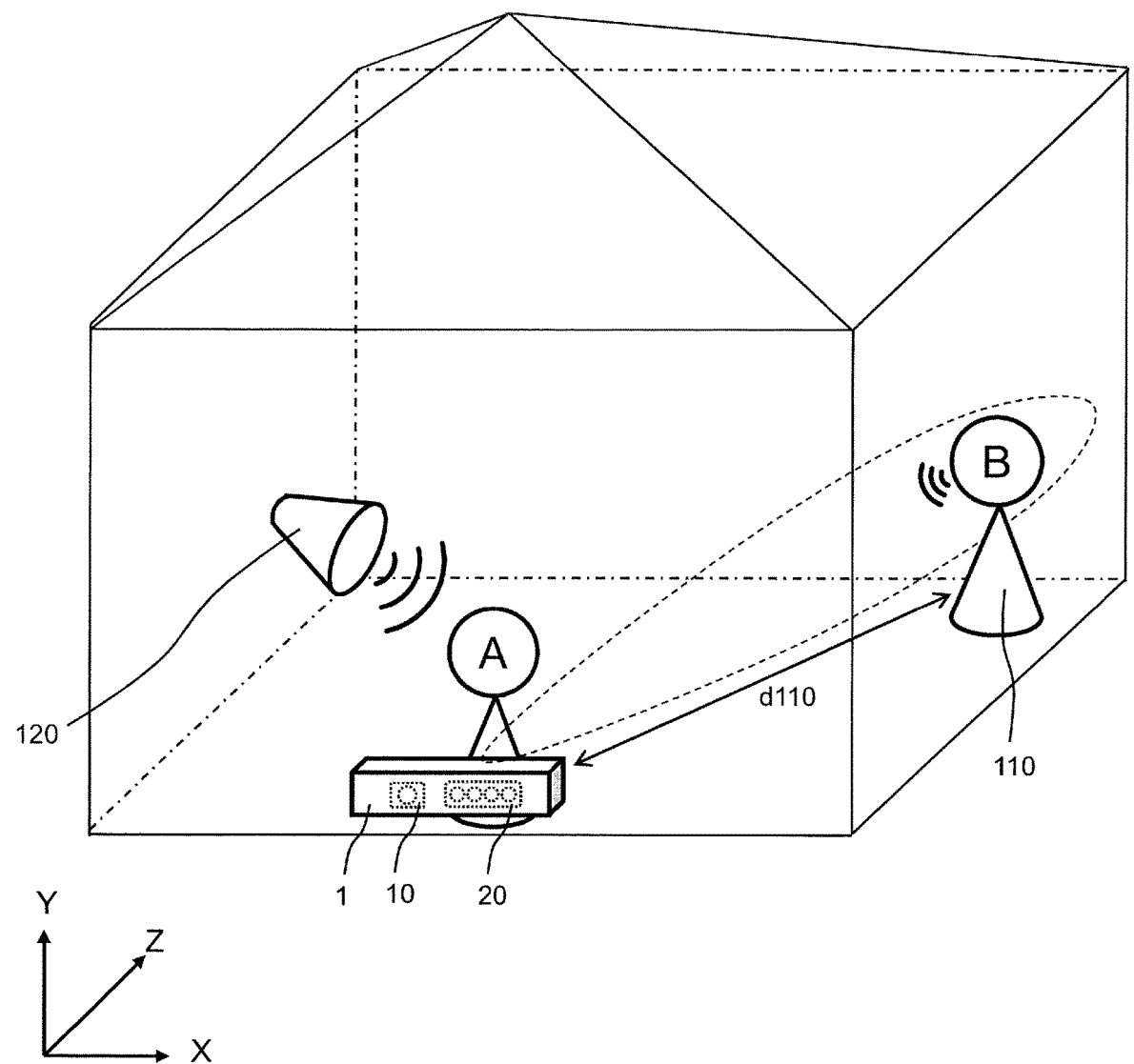
FIG. 3 is a diagram schematically depicting one example of a sound collection environment.

2. Operation of Signal Processing Device 2.1 Overview of Sound Collection of Target Sound FIG. 3 schematically depicts one example of a sound collection environment. In FIG. 3, the signal processing device 1 is disposed to be parallel to the floor face. In FIG. 3, an X-axis and a Y-axis respectively indicate the horizontal direction and the vertical direction for the orientation of the signal processing device 1 as the reference and a Z-axis indicates the depth direction for the position of the signal processing device 1 as the reference. For example, in the case where the sound collection direction is determined using only the acoustic signal output from the microphone array 20, when a noise emitted by a noise source 120 in the surroundings is louder than a sound of a person 110, the direction of the noise source 120 is consequently detected as the direction of the target sound source. In this case, the loud noise is consequently collected as the target sound and the sound of the person cannot be clearly collected. In the case where the camera 10 is concurrently used together with the microphone array 20 to determine the sound collection direction, the direction in which the person is present can be identified as the direction of the target sound source by detecting the position of the face of the person 110 included in the image data of the camera 10. The sound of the person can thereby be collected as the target sound. The sound of the person 110 cannot however be clearly collected when a distance d110 from the microphone array 20 to the person 110 is long. For example, the sound volume of the collected sound is reduced by the attenuation of the sound. In this embodiment, the collected target sound is therefore corrected in accordance with the distance d110 from the microphone array 20 to the target sound source.

2.2 Overall Operation of Signal Processing Device

Figure 4:
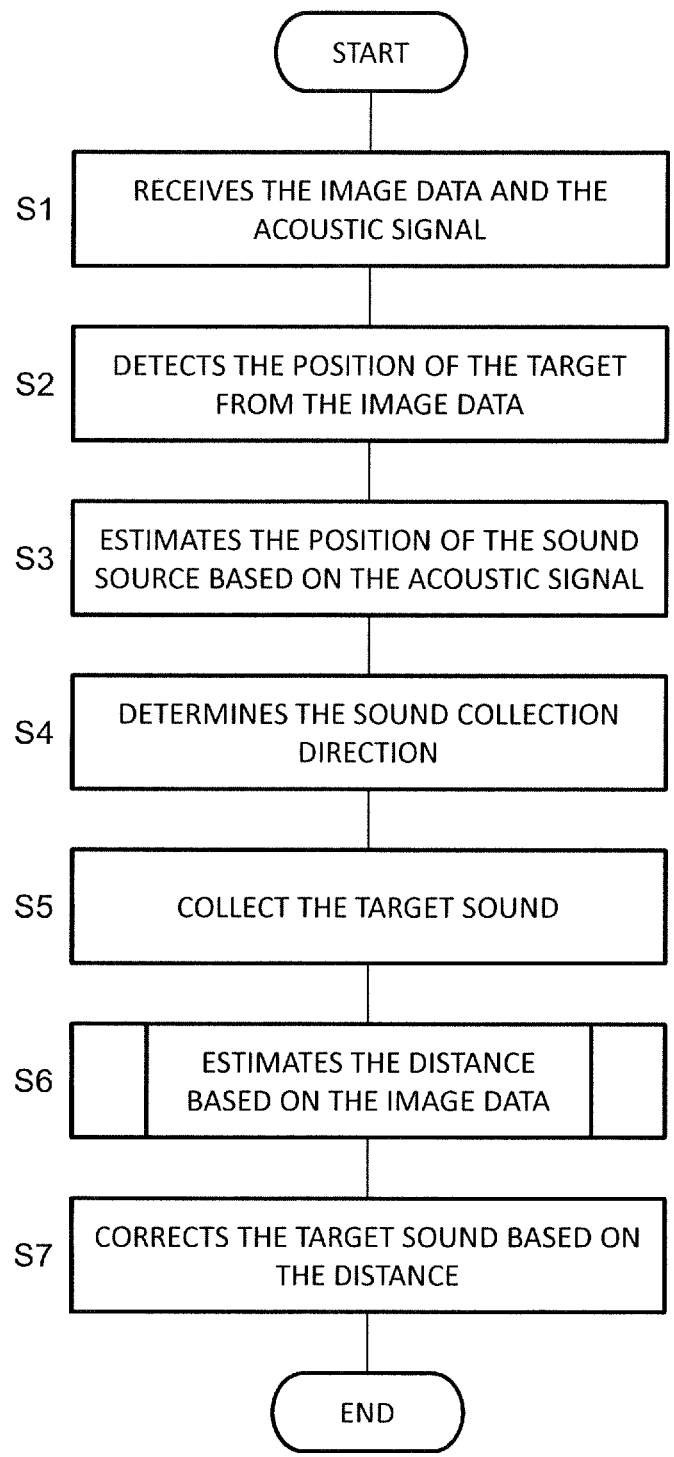
FIG. 4 is a flowchart depicting a signal processing method of the first embodiment.

FIG. 4 depicts a sound collection operation by the control circuit 30 that is the signal processing method of the first embodiment. The control circuit 30 receives the image data v produced by the camera 10 and the acoustic signal s output from the microphone array 20 (S1). For example, when the image data v and the acoustic signal s are stored in the storage 40, the control circuit 30 reads the image data v and the acoustic signal s from the storage 40. The control circuit 30 detects in the target detecting operation 31 the position of the target based on the image data v (S2). The control circuit 30 estimates in the sound source estimating operation 32 estimates the position of the sound source based on the acoustic signal s (S3). The control circuit 30 determines in the direction determining operation 33 the sound collection direction based on the position of the target detected by the target detecting operation 31 and the position of the sound source estimated by the sound source estimating operation 32 (S4). The control circuit 30 forms in the target sound collecting operation 34 the directivity in the sound collection direction by beam-forming to collect the target sound (S5). The control circuit 30 estimates in the distance estimating operation 35 the distance from the microphone array 20 to the target sound source based on the image data v (S6). The control circuit 30 corrects in the target sound correcting operation 36 the target sound based on the distance from the microphone array 20 to the target sound source (S7).

In FIG. 4, the order of the position detection for the target at step S2 and the position estimation for the sound source at step S3 may be reversed. The distance estimation at step S6 only has to be executed before the correction of the target sound at step S7 and may be executed between, for example, step S2 and step S3.

2.3 Position Detection of Target

The details of the position detection (S2) of the target will be described.

Figure 5A:
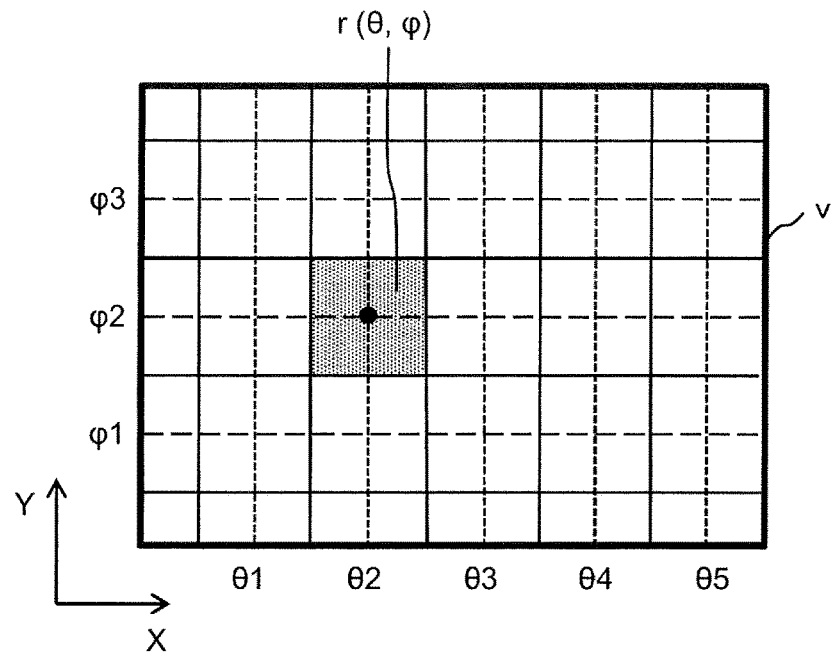
FIG. 5A is an explanatory diagram of a determination area in image data.

FIG. 5A depicts the determination area $r(\theta,\phi)$ to detect the position of the target in the image data v. The image data v produced by the camera 10 can be divided into plural determination areas $r(\theta,\phi)$ in accordance with the horizontal angle and the vertical angle of the camera 10. The image data v may be circumferentially divided or may be divided in a grid, in accordance with the type of the camera 10.

At step S2, in the target detecting operation 31 the control circuit 30 determines whether the target is present for each of the determination areas $r(\theta,\phi)$. For example, the control circuit 30 calculates the probability $Pv(\theta,\phi)$ for the image in the determination area $r(\theta,\phi)$ to be the target in the image data v. The detection method for the target is optional. As one example, the detection of the target is executed by determining whether each of the determination areas $r(\theta,\phi)$ matches with the feature of the target (see "Rapid Object Detection Using a Boosted Cascade of Simple Features", ACCEPTED CONFERENCE ON COMPUTER VISION AND PATTERN RECOGNITION 2001).

In this embodiment, to detect the face of the person as the target, for example, the control circuit 30 includes N weak discriminators each including information that indicates different features of a face. The control circuit 30 calculates the number of sessions $C(r(\theta,\phi))$ for the N weak discriminators to each determine that the image in the determination area $r(\theta,\phi)$ is a face. The control circuit 30 executes determination as to whether the image is a face for each of all the determination areas $r(\theta,\phi)$ in the image data v, and next calculates the probability $Pv(\theta,\phi)$ for the image at the position identified by the horizontal angle $\theta$ and the vertical angle $\phi$ in the image data v to be a face using Eq. (1).

[Eq. 1]

$$Pv(\theta, \varphi) = \frac{1}{N} C(r(\theta, \varphi)) \quad (1)$$

2.4 Position Estimation for Sound Source

Figure 5B:
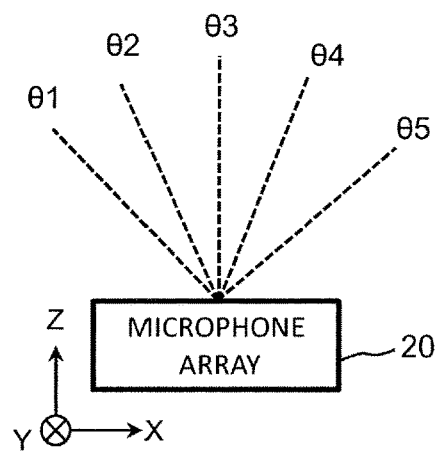
FIG. 5B is an explanatory diagram of directions of a sound source at horizontal angles.
Figure 5C:
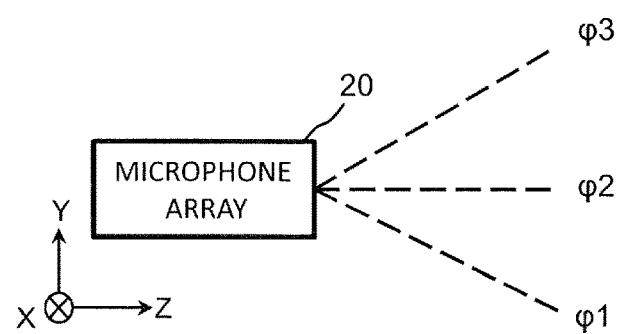
FIG. 5C is an explanatory diagram of directions of the sound source at vertical angles.

The details of the position estimation for the sound source (S3) will be described. FIG. 5B schematically depicts positions in horizontal directions of a sound wave coming to the microphone array 20. FIG. 5C schematically depicts positions in horizontal directions of the sound wave coming to the microphone array 20.

At step S3, in the sound source estimating operation 32 the control circuit 30 calculates the probability $Ps(\theta,\phi)$ for the sound source to be present in the direction identified by the horizontal angle $\theta$ and the vertical angle $\phi$. The estimation method for the position of the sound source is optional. For example, the position estimation for the sound source can be executed using a cross-power spectrum phase analysis (CSP) method or a multiple signal classification (MUSIC) method.

Figure 6:
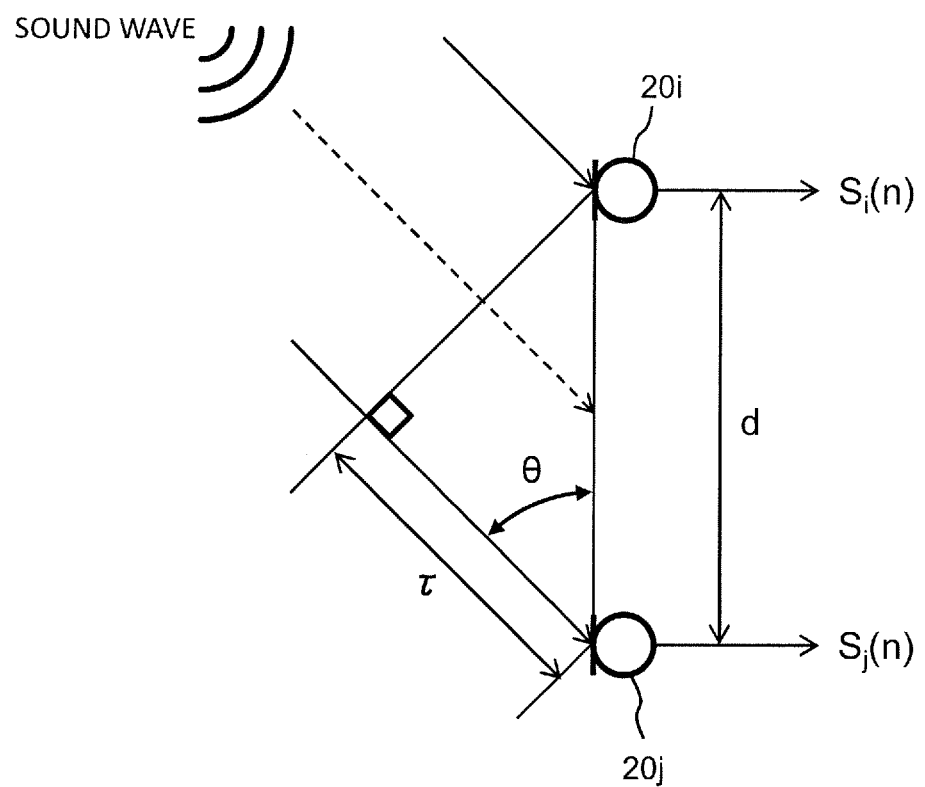
FIG. 6 is an explanatory diagram of estimation of the position of the sound source.

The CSP method will be described that is one example of the position estimation method for the sound source at step S3. FIG. 6 is schematically depicts the state where the sound wave comes to microphones 20i and 20j of the microphone array 20. When the sound wave comes to the microphones 20i and 20j, a time difference $\tau$ is generated in accordance with the distance d between the microphones 20i and 20j. The control circuit 30 calculates the probability $Ps(\theta)$ for the sound source to be present at the horizontal angle $\theta$ using Eq. (2) that uses a CSP coefficient.

[Eq. 2]

$$Ps(\theta) = CSP(\tau) \quad (2)$$

The CSP coefficient can be acquired using Eq. (3) (see "Position Estimation for Plural Sound Sources based on CSP Method Using Microphone Array", Institute of Electronics, Information, and Communication Engineers Transactions, D-11, Vol. J83-D-11, No. 8, pp. 1713-1721). In Eq. (3), represents the time, $S_i(n)$ represents an acoustic signal received by the microphone 20i, and $S_j(n)$ represents an acoustic signal received by the microphone 20j. In Eq. (3), DFT represents discrete Fourier transform. * represents a conjugate complex number.

[Eq. 3]

$$CSP_{i,j}(\tau) = DFT^{-1}\left[\frac{DFT[S_i(n)]DFT[S_j(n)]*}{|DFT[S_i(n)]||DFT[S_j(n)]|}\right] \quad (3)$$

The time difference $\tau$ can be represented by Eq. (4) using the sound velocity c, the distance d between the microphones 20i and 20j, and a sampling frequency $F_s$.

[Eq. 4]

$$\tau = \frac{dF_s}{c}\cos(\theta) \quad (4)$$

As represented by Eq. (5), the probability $Ps(\theta)$ for the sound source to be present at the horizontal angle $\theta$ can be calculated by converting the CSP coefficient in Eq. (2) from that on the time axis into that on the direction axis using Eq. (4).

[Eq. 5]

$$Ps(\theta) = CSP\left(\frac{dF_s}{c}\cos(\theta)\right) \quad (5)$$

Similar to the probability $Ps(\theta)$ for the horizontal angle $\theta$, the probability $Ps(\phi)$ for the sound source to be present at the vertical angle $\phi$ can be calculated using the CSP coefficient and the time difference $\tau$. The probability $Ps(\theta,\phi)$ for the sound source to be present at the horizontal angle $\theta$ and the vertical angle φ can be calculated based on the probability Ps(θ) and the probability Ps(φ).

2.5 Determination of Sound Collection Direction

The details of the determination of the sound collection direction (S4) will be described. As depicted in FIG. 5A to FIG. 5C, the position of the coordinate system in the image data v produced by the camera 10 is correlated with the horizontal angle θ and the vertical angle φ that indicate the generation direction of the sound wave coming to the microphone array 20 in accordance with the field angle of the camera 10. At step S4, in the direction determining operation 33 the control circuit 30 calculates the probability P(θ,φ) for the person emitting the target sound to be present using Eq. (6), using the target probability Pv(θ,φ) and the sound source probability Ps(θ,φ).

[Eq. 6]

$$P(\theta,\varphi) = Pv(\theta,\varphi) + Ps(\theta,\varphi) \quad (6)$$

The control circuit 30 determines the horizontal angle θ and the vertical angle φ at which the probability P (θ,φ) is maximal as the sound collection direction, using Eq. (7).

[Eq. 7]

$$\theta c, \varphi c = \mathrm{argmax}(P(\theta,\varphi)) \quad (7)$$

2.6 Collection of Target Sound

Figure 7:
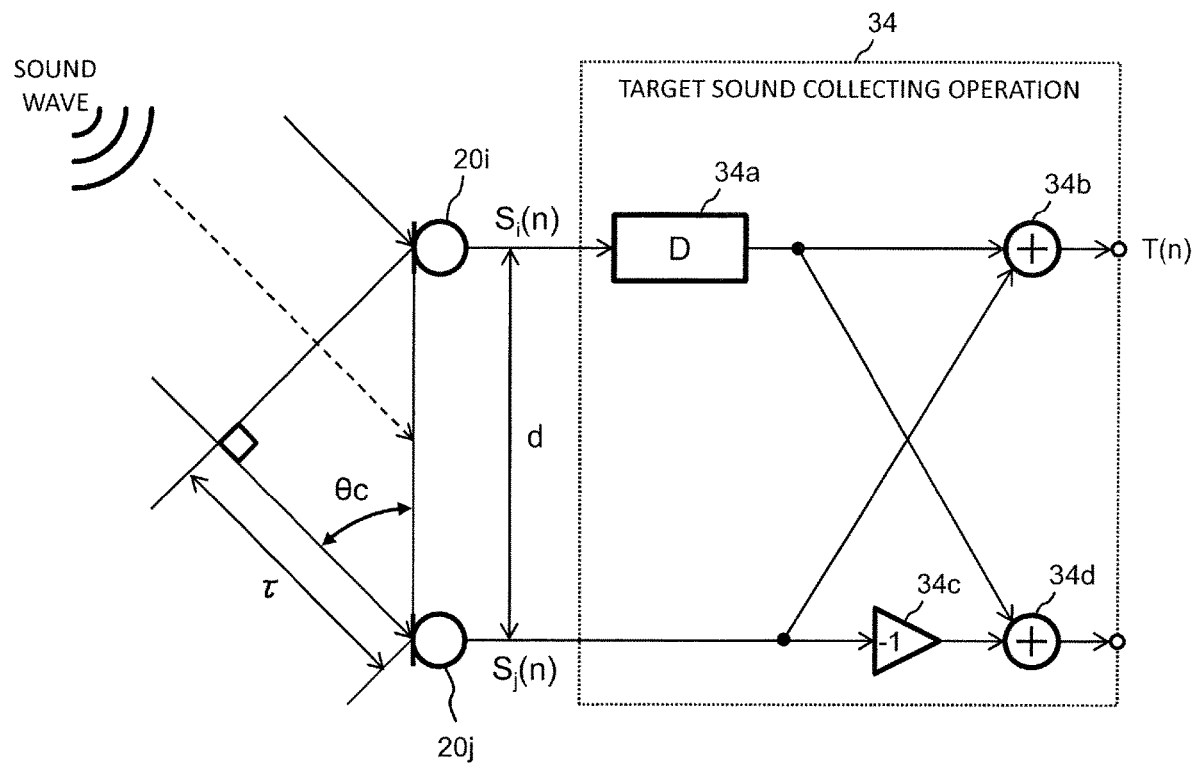
FIG. 7 is an explanatory diagram of collection of a target sound using beam-forming.

The details of the collection of the target sound (S5) will be described. FIG. 7 exemplifies the beam-forming by the target sound collecting operation 34 executed by the control circuit 30. FIG. 7 depicts the example where the microphone array 20 includes the two microphones 20i and 20j. The example where the microphone array 20 includes the two microphones 20i and 20j will be described in this embodiment while the microphone array 20 may include three or more microphones. The timings of reception of the sound wave coming from the direction at the horizontal angle θ at the microphones 20i and 20j differ from each other in accordance with the distance d between the microphones 20i and 20j. For example, at the microphone 20j, a propagation delay of an amount corresponding to a distance d cos θ is generated. A phase difference is generated between the acoustic signals output from the microphones 20i and 20j.

In this embodiment, the control circuit 30 includes a delay instrument 34a and an adder 34b for use in the target sound collecting operation 34. At step S5, in the target sound collecting operation 34 the control circuit 30 executes signal processing that emphasizes the sound coming from the horizontal angle θc and the vertical angle φc that is the sound collection direction by the beam-forming for the acoustic signal output by the microphone array 20. For example, for an input signal $S_i(n)$ input into the microphone 20i, the delay instrument 34a corrects the in-coming time difference between those of the input signal Si(n) and an input signal Sj(n) input into the microphone 20j based on the delay amount in accordance with the horizontal angle θc that is the sound collection direction. The adder 34b produces an output signal T(n) based on the sum of the input signal $S_i(n)$ after the correction and the input signal $S_j(n)$.

At an input of the adder 34b, the phases of the signals coming from the horizontal angle θc that is the sound collection direction, and the signal coming from the sound collection direction is therefore emphasized in the output signal T(n). On the other hand, signals coming from directions other than the horizontal angle θc have phases that do not match with each other, and are therefore not so much emphasized as the signal coming from the horizontal angle θc is. The directivity is therefore formed in the direction of the horizontal angle θc by, for example, using the output of the adder 34b. The sound wave coming from the horizontal angle θc that is the sound collection direction is thereby collected as the target sound. The example in FIG. 7 exemplifies the sound collection direction at the horizontal angle θc while the directivity can similarly be formed also for the sound collection direction at the vertical angle φc. The method for the beam-forming is optional and the beam-forming may be executed using a method other than that depicted in FIG. 7.

2.7 Estimation of Distance to Target

Figure 8:
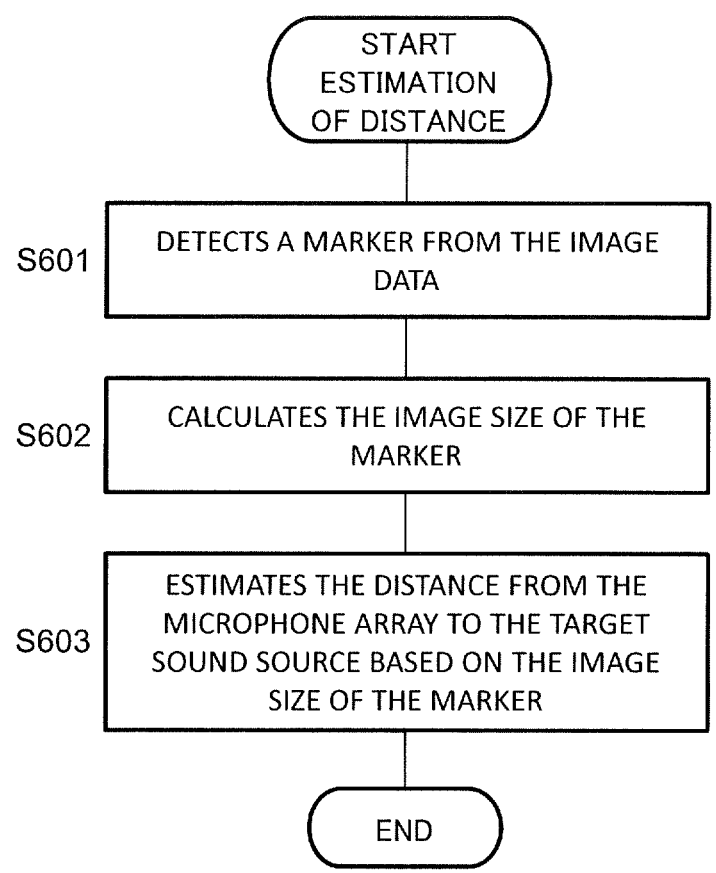
FIG. 8 is a flowchart depicting the details of estimation of a distance.
Figure 9:
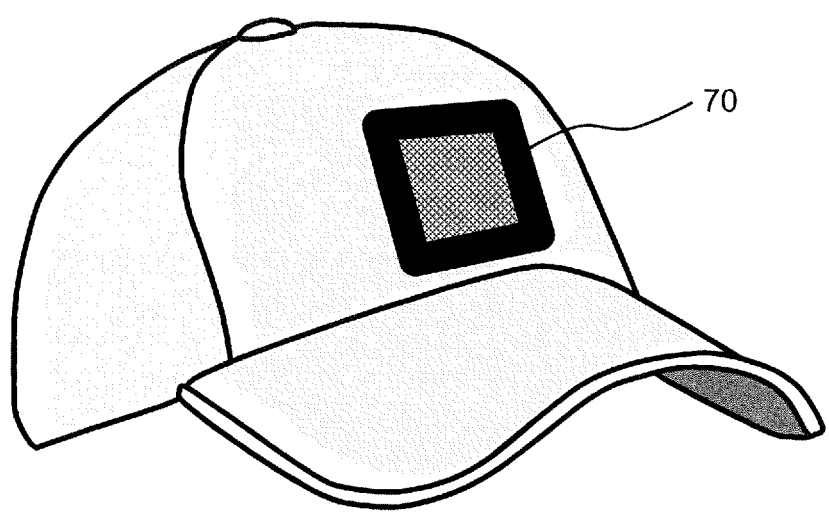
FIG. 9 is a diagram depicting one example of a marker attached to an object.
Figure 10:
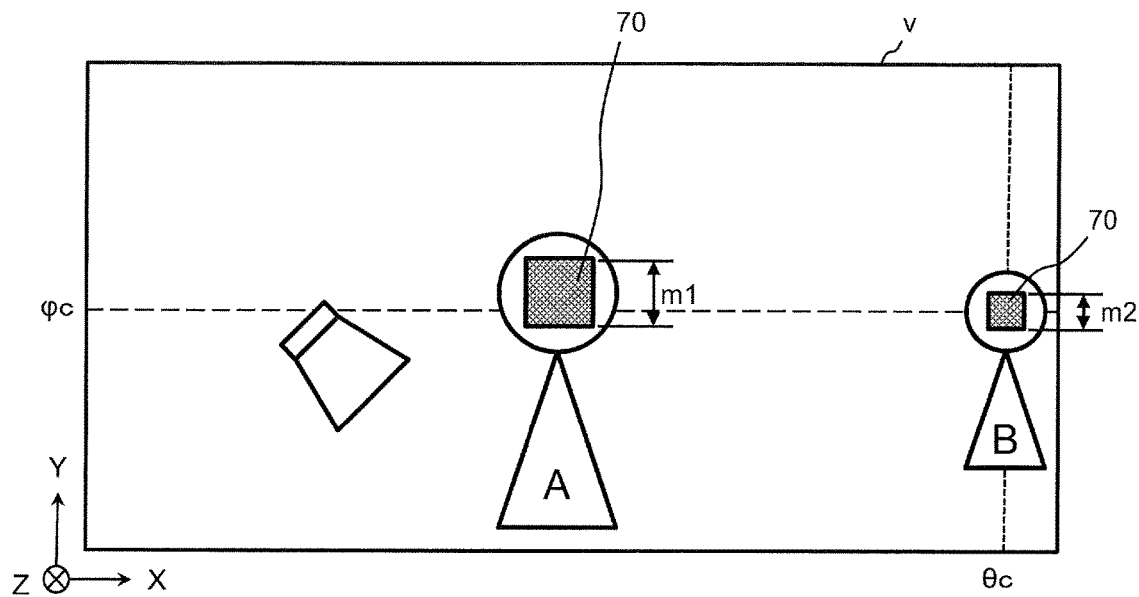
FIG. 10 is an explanatory diagram of calculation of an image size of the marker.
Figure 11:
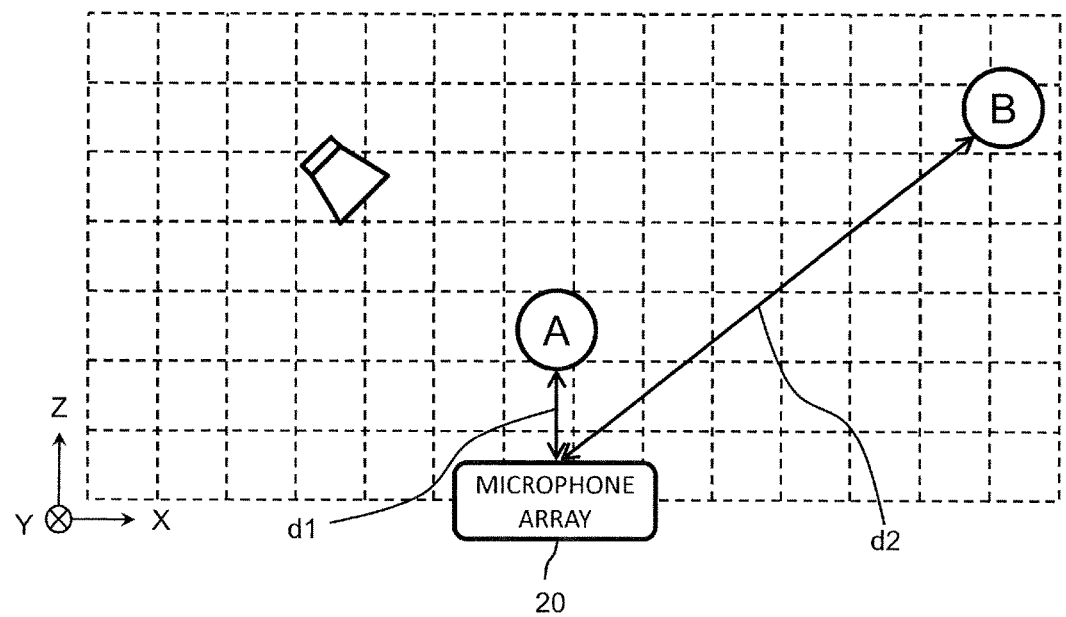
FIG. 11 is an explanatory diagram of calculation of a distance to a target sound source.

The details of the estimation of the distance to the target (S6) will be described. FIG. 8 depicts an estimation operation for the distance from the microphone array 20 to the target sound source by the distance estimating operation (the details of S6). FIG. 9 depicts one example of the marker used in the estimation of the distance. FIG. 10 is a diagram illustrating calculation of the image size of the marker. FIG. 11 is a diagram illustrating the estimation of the distance to the target sound source based on the image size of the marker.

In the distance estimating operation 35 the control circuit 30 detects a marker from the image data v produced by the camera 10 based on the marker information 41 stored in the storage 40 (S601). As depicted in FIG. 9, the marker 70 in this embodiment is a mark attached to a cap. For example, sizes of such marks are unified into a predetermined original size. In this embodiment, at least the person emitting the target sound wears a cap to which the marker 70 is attached. For example, all workers working in a plant may each wear this cap. In this embodiment, the marker 70 is square-shaped. The shape of the marker 70 is however not limited to the square and may be, for example, a triangle, a polygon having five or more corners, or a circle. The marker 70 only has to have a fixed size and be attachable to the object emitting the target sound. The marker 70 may have a flat-plate shape or may have another shape.

In the distance estimating operation 35 the control circuit 30 calculates the image size of the detected marker 70 (S602). For example, as depicted in FIG. 10, the control circuit 30 may calculate image sizes m1 and m2 of all the markers 70 included in the image data v. The control circuit 30 may calculate the image size m2 only for the marker 70 present at the horizontal angle θc and the vertical angle φc that is the sound collection direction. The image size is represented by, for example, a pixel value.

In this operation 35, the control circuit 30 estimates the distance from the microphone array 20 to the target sound source based on the image size of the marker 70 (S603). For example, as depicted in FIG. 11, the control circuit 30 calculates the distance from the camera 10 to the marker based on the size of the marker indicated by the marker information 41 stored in the storage 40 and the image size of the marker calculated at step S602. An absolute distance is thereby estimated that is the distance from the microphone array 20 to the target sound source. For example, the control circuit 30 determines that the marker 70 present at the horizontal angle θc and the vertical angle φc that is the sound collection direction corresponds to the target sound source, and estimates the distance from the microphone array 20 to the target sound source. At step S601, in the case where only one marker 70 is detected in the image data v, the distance to this marker 70 may be estimated as the distance to the target sound source. The distance estimating operation may calculate, for example, "d2/d1" in relation to a relative distance from the microphone array 20 to the target sound source based on the image sizes m1 and m2 of the plural markers 70 included in the image data v.

2.8 Correction of Target Sound

Figure 12:
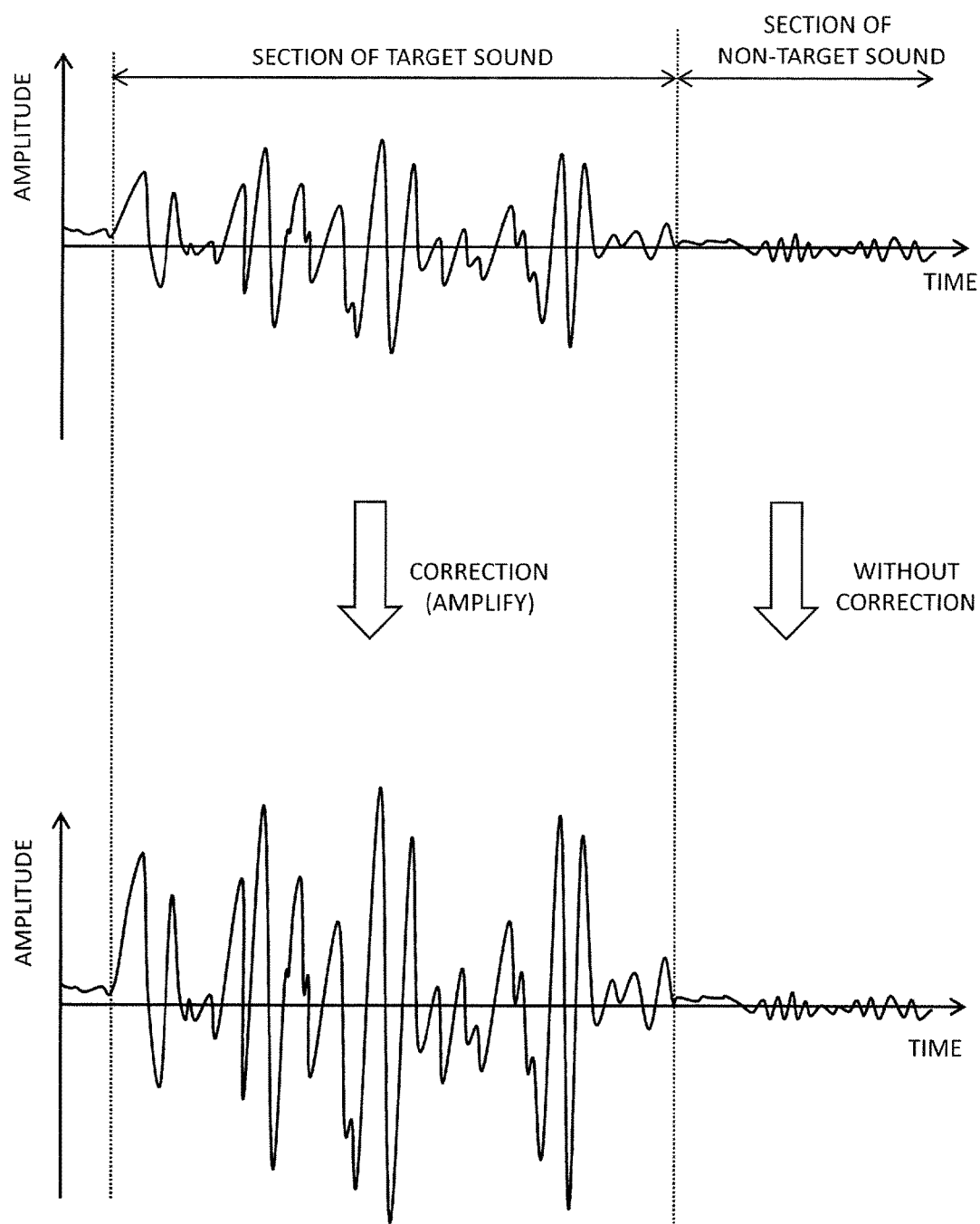
FIG. 12 is an explanatory diagram of correction of a target sound.

The details of the correction of the target sound (S7) will be described. FIG. 12 depicts one example of the correction of the target sound by the target sound correcting operation 36, and depicts the waveforms of the signals input into and output from the target sound correcting operation 36. For example, the control circuit 30 amplifies the amplitude of the sound signal which is output as a result of the target sound collecting operation 34 when the distance from the microphone array 20 to the target sound source is long. The target sound having amplified sound volume can be acquired even in the case where the distance from the microphone array 20 to the target sound source is long and the attenuation amount of the sound is large. The amplification amount may be made different in accordance with the distance from the microphone array 20 to the target sound source. For example, the amplification amount may be set to be larger as the distance is longer. As depicted in FIG. 12, the control circuit 30 amplifies the amplitude of the signal of a section that includes the target sound in this operation 36. The control circuit 30 may vary the frequency property of the sound signal of the target sound in accordance with the distance from the microphone array 20 to the target sound source. For example, noise reduction may be executed that reduces more the noise as the distance is longer. For example, the frequency component of a band on the high-frequency side may be emphasized more as the distance is longer. The control circuit 30 may compare the absolute distance from the microphone array 20 to the target sound source with a predetermined threshold value, and may correct the target sound when the absolute distance is equal to or longer than the threshold value. The control circuit 30 may compare, for example, the relative distance of a person B relative to a person A with a threshold value, and may correct the target sound emitted by the person B when the relative distance is equal to or longer than the threshold value.

3. Effects and Supplement

The signal processing device 1 of this embodiment is a sound collecting machine that collects a target sound output from an object to be a sound source. The signal processing device 1 includes the input device that inputs or receives the image data v produced by the camera 10 and the acoustic signal s output from the microphone array 20, and the control circuit 30 that controls the sound collection direction of the acoustic signal s based on the image data v and the acoustic signal s. The input device is, for example, the control circuit 30 that acquires the image data v from the camera 10 or reads the image data v from the storage 40. The input device is, for example, the control circuit 30 that acquires the acoustic signal s from the microphone array 20 or reads the acoustic signal s from the storage 40. The control circuit 30 performs the distance estimating operation and the target sound correcting operation 36. In the distance estimating operation 35, the control circuit 30 detects the marker 70 attached to the target from the image data v, estimates the distance from the microphone array 20 to the target sound source based on the detected marker 70, and outputs the distance information that indicates the estimated distance. The control circuit 30 corrects the target sound based on the distance information.

As above, the signal processing device 1 identifies the position of the object to be the sound source using the camera 10 and the microphone array 20, and thereby corrects the collected target sound in accordance with the distance from the microphone array 20 to the target sound source. In other words, the signal processing device 1 acquires a desired target sound based on the position identified by the horizontal direction and the vertical direction, and the distance in the depth direction. A highly precise target sound can therefore be acquired. In the case where the target sound after the correction is used in, for example, sound recognition, the precision of the sound recognition is improved compared to the case where the target sound before the correction is used.

The marker 70 has the predetermined size and the control circuit 30 calculates in the distance estimating operation 35 the distance from the camera 10 to the marker 70 based on the image size of the marker 70 in the image data and thereby estimates the distance from the microphone array to the target sound source. The distance from the microphone array 20 to the target sound source can thereby be highly precisely estimated.

Second Embodiment

In the first embodiment, the target sound is corrected in accordance with the distance from the microphone array 20 to the target sound source. In this embodiment, the target sound is corrected based on an attribute of the target sound source in addition to the distance. Note that in the following descriptions concerning respective embodiments, various types of operations are described as performing certain associated functions. Such descriptions are adopted only for a purpose of convenience. The control circuit 30 performs those operations to achieve the associated functions as discussed in the first embodiment.

Figure 13:
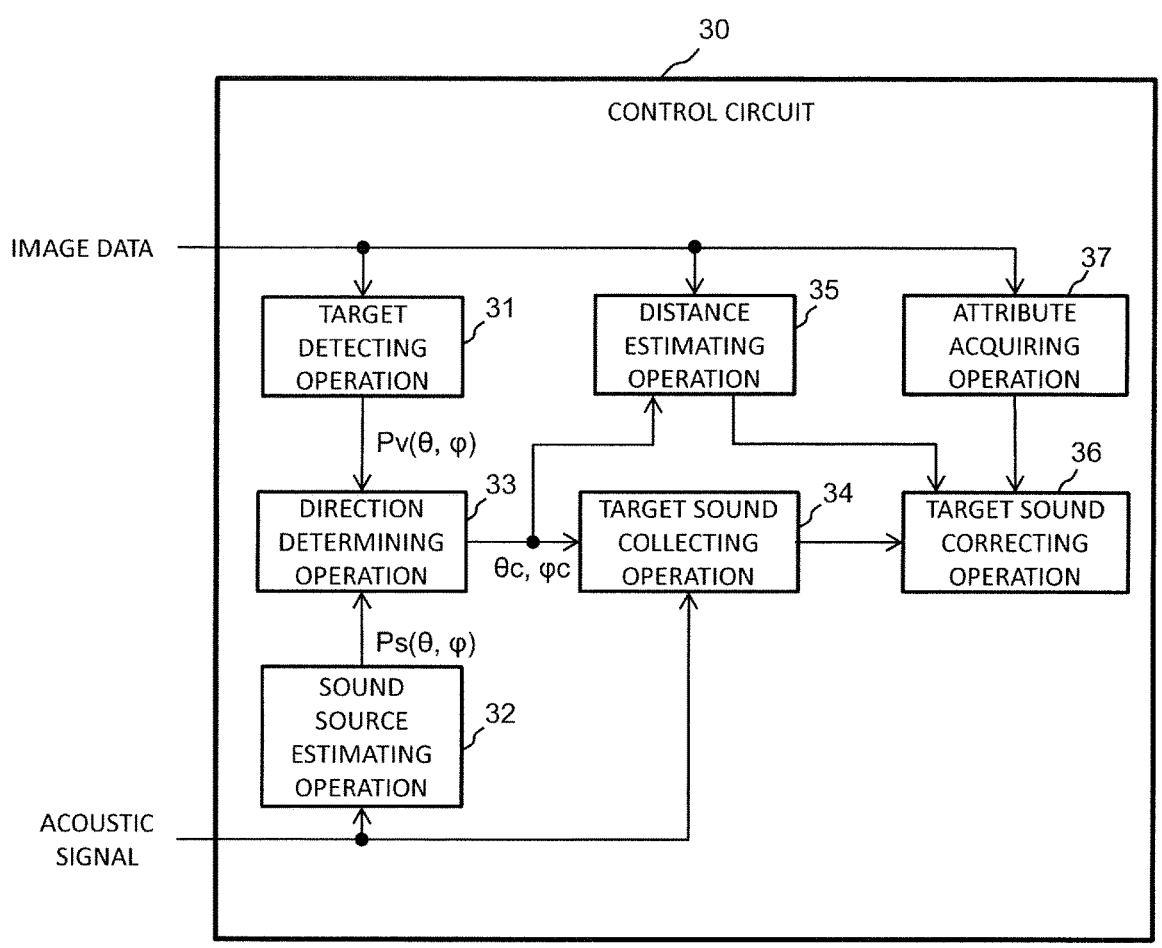
FIG. 13 is a block diagram depicting one example of functions of a control circuit of the second embodiment.

FIG. 13 depicts an exemplary configuration of a control circuit 30 in view of its operations in the second embodiment. The control circuit 30 of this embodiment further includes an attribute acquiring operation 37 in addition to the configuration of the control circuit 30 of the first embodiment. The attribute acquiring operation 37 acquires attribute information from the image data v.

Figure 14:
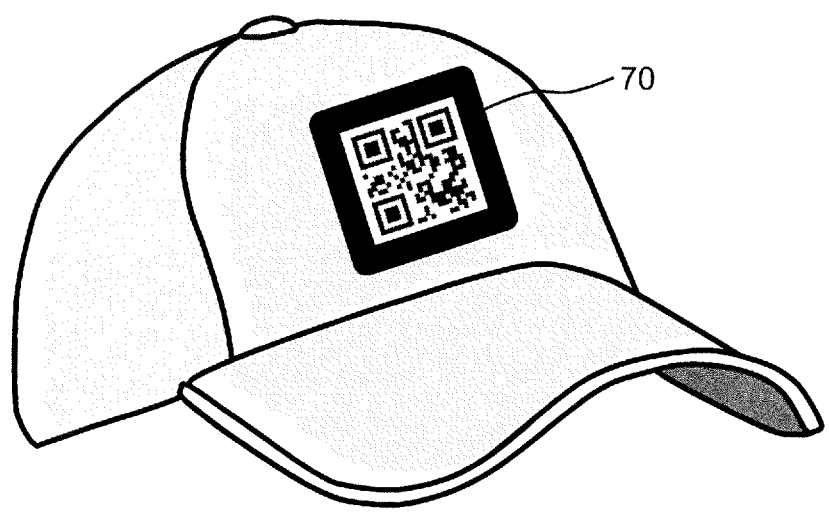
FIG. 14 is a diagram depicting one example of a marker that includes attribute information.

FIG. 14 depicts one example of a marker that includes the attribute information. The attribute information is information to distinguish the attribute of the sound source and, in this embodiment, indicates the attribute relating to a person that is the target sound source. The attribute information indicates, for example, the sex of a person. The attribute information may be information to distinguish a person working in a plant. The marker 70 including the attribute information is, for example, a QR code (a registered trademark) or an AR marker. The attribute information may be included in a portion of the marker 70 or may be represented by the overall marker 70.

Figure 15:
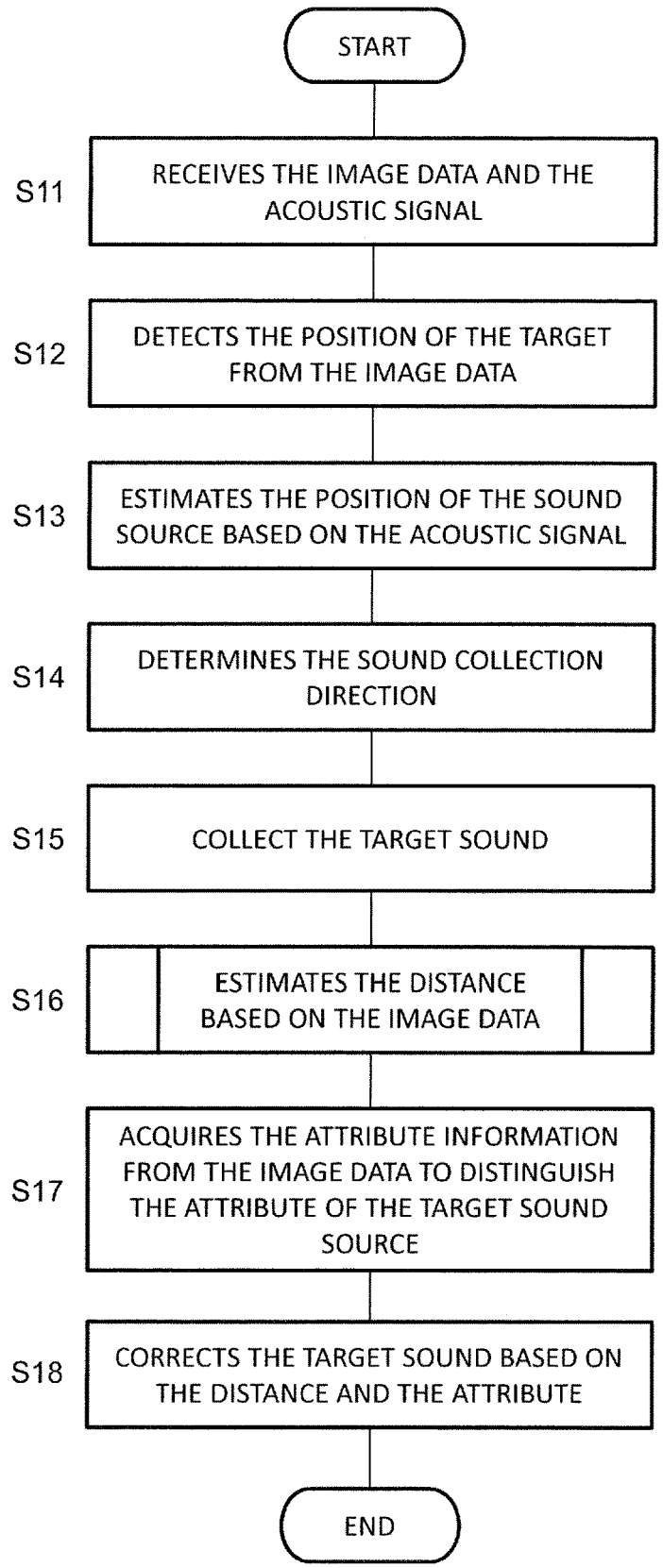
FIG. 15 is a flowchart depicting a signal processing method of the second embodiment.

FIG. 15 depicts an operation of the control circuit 30 of a signal processing deice 1 in the third embodiment. Steps S11 to S16 in FIG. 5 are identical to steps S1 to S6 in FIG. 4 of the first embodiment. In this embodiment, the attribute acquiring operation 37 acquires the attribute information from the image data v to distinguish the attribute of the target sound source (S17). The attribute acquiring operation 37 acquires the attribute information from the image of the marker 70 detected at step S16 to distinguish, for example, the sex of the target. A program to analyze the QR code may be stored in the storage 40.

The target sound correcting operation 36 corrects the target sound based on the distance estimated at step S16 and the attribute distinguished at step S17 (S18). For example, the target sound correcting operation 36 amplifies the sound signal in accordance with the distance from the microphone array 20 to the person, and varies the frequency property of the sound signal in accordance with the sex of the person.

As above, in this embodiment, the marker 70 includes the attribute information to distinguish the attribute of the target sound source. The control circuit 30 further includes the attribute acquiring operation 37 that acquires the attribute information from the image data v, and the target sound correcting operation 36 corrects the target sound based on the distance information and the attribute information. A more highly precise target sound can thereby be acquired.

Third Embodiment

In the first embodiment, the control circuit 30 corrects the collected target sound in accordance with the distance from the camera 10 to the marker 70. In this embodiment, a control circuit 30 controls the sound collection in accordance with the distance from the camera 10 to the marker 70 in addition to the correction of the target sound. In this embodiment, the information on the distance from the camera 10 to the marker 70 is used not only after the target sound is collected but also when the target sound is collected.

Figure 16:
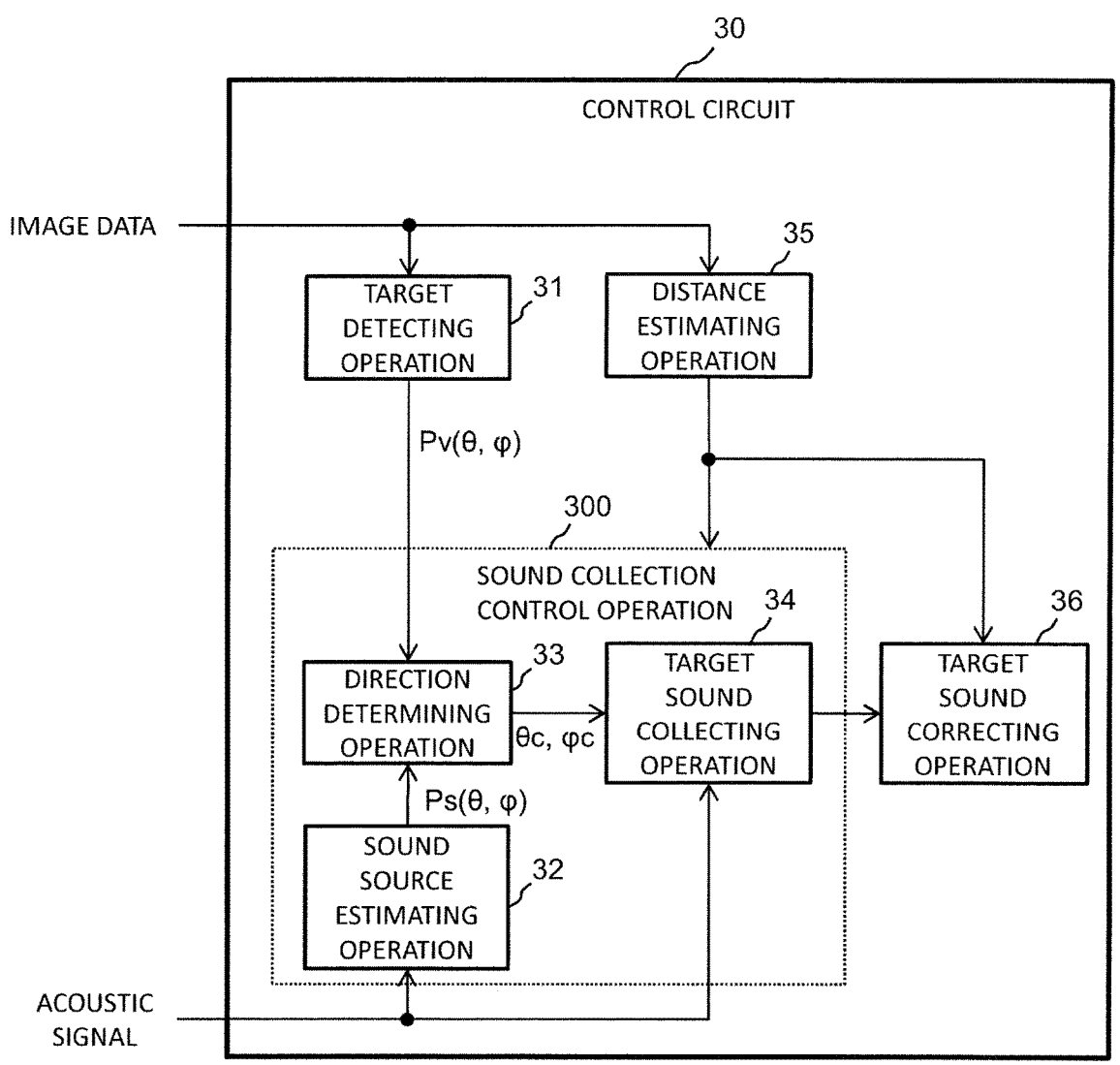
FIG. 16 is a block diagram depicting one example of functions of a control circuit of the third embodiment.

FIG. 16 depicts an exemplary configuration of the control circuit 30 in view of its operations in the third embodiment. In this embodiment, the distance information indicating the distance from the camera 10 to the marker 70 is output from the distance estimating operation 35 to the sound collection control operation 300. The sound source estimating operation 32 estimates the position of the sound source in accordance with the distance from the camera 10 to the marker 70. When the direction determining operation 33 determines the sound collection direction, the direction determining operation 33 varies the degree of priority of each of the object position information and the sound source position information, that is, the weight of the sound source probability Ps $(\theta,\phi)$ against the target probability Pv$(\theta,\phi)$ in accordance with the distance from the camera 10 to the marker 70. The target sound collecting operation 34 varies the range of the sound collection direction, that is, the beam width at the horizontal angle $\theta$c and the vertical angle $\phi$c that indicate the sound collection direction in accordance with the distance from the camera 10 to the marker 70. The example where all of the sound source estimating operation 32, the direction determining operation 33, and the target sound collecting operation 34 use the distance information has been described in this embodiment while the configuration may be employed according to which at least any one of the sound source estimating operation 32, the direction determining operation 33, and the target sound collecting operation 34 uses the distance information.

Figure 17:
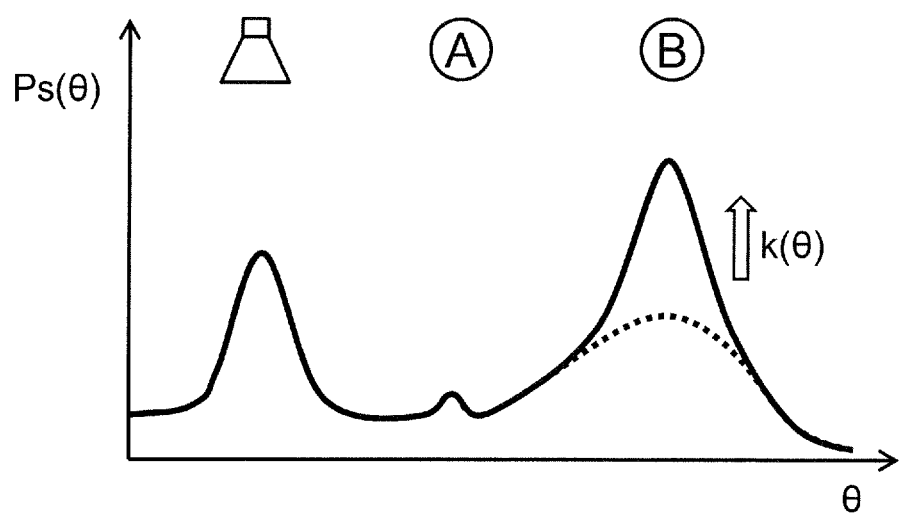
FIG. 17 is an explanatory diagram of position estimation for a sound source in accordance with the distance in the third embodiment.

FIG. 17 is an explanatory diagram of position estimation for the sound source in accordance with the distance. The sound source probability Ps$(\theta,\phi)$ estimated from the acoustic signal s is loser as the distance from the microphone array 20 to the sound source is longer. For example, the sound source estimating operation 32 may set a coefficient k for each of the horizontal angles $\theta$ such that the value of the coefficient k is greater as the distance from the camera 10 to the marker 70 is longer, for the sound source probability Ps$(\theta)$ calculated using Eq. (5), to calculate "Ps$(\theta)\times$k$(\theta)$". For the vertical angle $\phi$, the sound source estimating operation 32 may similarly set the coefficient k for each of the vertical angles such that the value of the coefficient k is greater as the distance from the camera 10 to the marker 70 is longer, to calculate "Ps$(\phi)\times$k$(\phi)$". The sound source estimating operation 32 may output "Ps$(\theta,\phi)\times$k$(\theta,\phi)$" as sound source position information to the direction determining operation 33.

Figure 18:
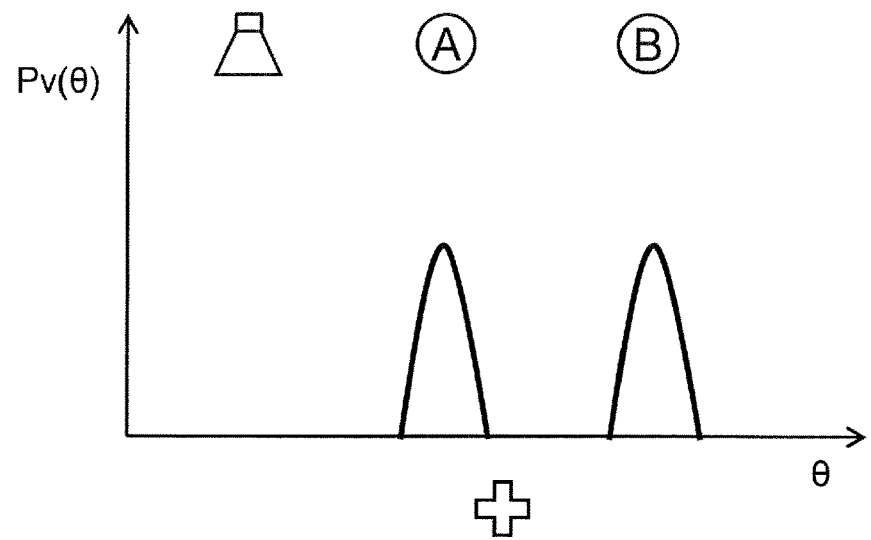
FIG. 18 is an explanatory diagram of determination of a sound collection direction in accordance with the distance in the third embodiment.
Figure 18:
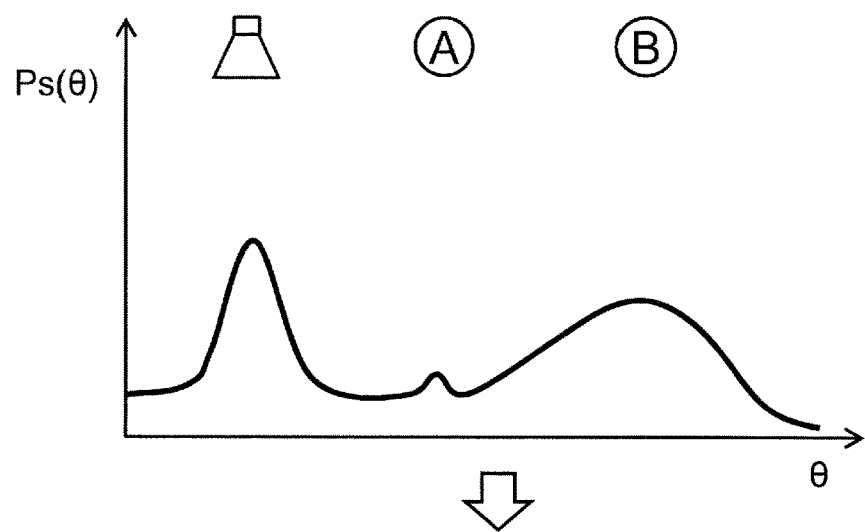
Figure 18:
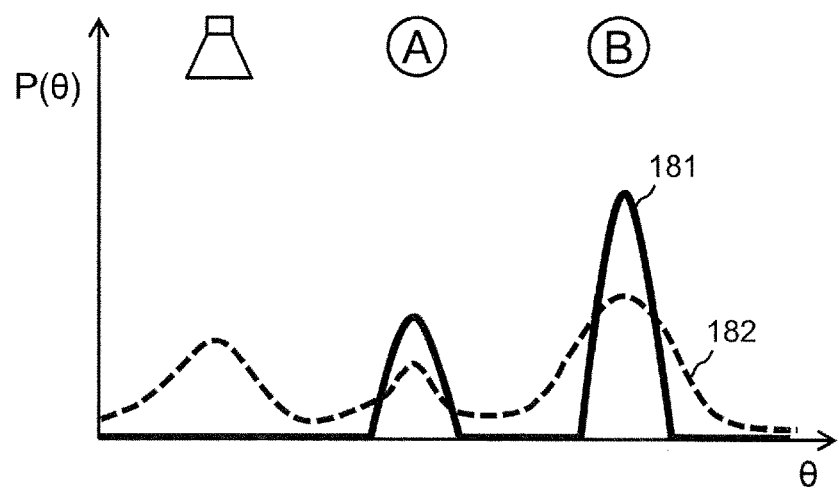

FIG. 18 is an explanatory diagram of the determination of the sound collection direction by the direction determining operation 33. For example, in the determination of the direction based on Eq. (6) above, the direction determining operation 33 may calculate the probability P$(\theta,\phi)$ for the person that is the target sound source to be present using "Pv$(\theta,\phi)$+W$\times$Ps$(\theta,\phi)$" setting the weight W of the sound source probability Ps$(\theta,\phi)$ to be smaller as the distance from the camera 10 to the marker 70 is longer. In this manner, the degree of priority of each of the target probability Pv$(\theta,\phi)$ acquired from the image data and the sound source probability Ps$(\theta,\phi)$ acquired from the acoustic signal may be varied in accordance with the distance from the camera 10 to the marker 70. For example, in FIG. 18, in the case where the target probability Pv$(\theta)$ is prioritized, the probability distribution indicated by a solid line 181 is established and, in the case where the sound source probability Ps$(\theta)$ is prioritized, the probability distribution indicated by a dotted line 182 is established.

Figure 19:
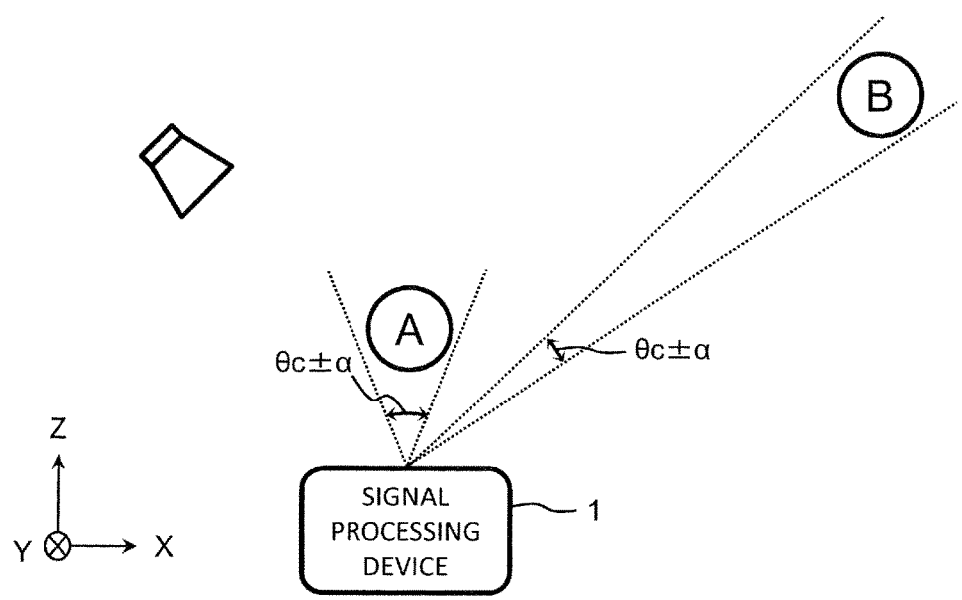
FIG. 19 is an explanatory diagram of the range of the sound collection in accordance with the distance in the third embodiment.

FIG. 19 schematically depicts the range of the sound collection of the target sound by the target sound collecting operation 34. The target sound collecting operation 34 may set an angle $\alpha$ such that, for example, the beam width "$\theta$c$\pm\alpha$" that is the range for the directivity to be actually formed in for the horizontal angle $\theta$c of the determined sound collection direction is smaller as the distance from the microphone array 20 to the target sound source is longer. For the vertical angle $\phi$c of the sound collection direction, the target sound collecting operation 34 may similarly set an angle $\beta$ such that the beam width "$\phi$c$\pm\beta$" that is the range for the directivity to be formed in is smaller as the distance from the microphone array 20 to the target sound source is longer.

Figure 20:
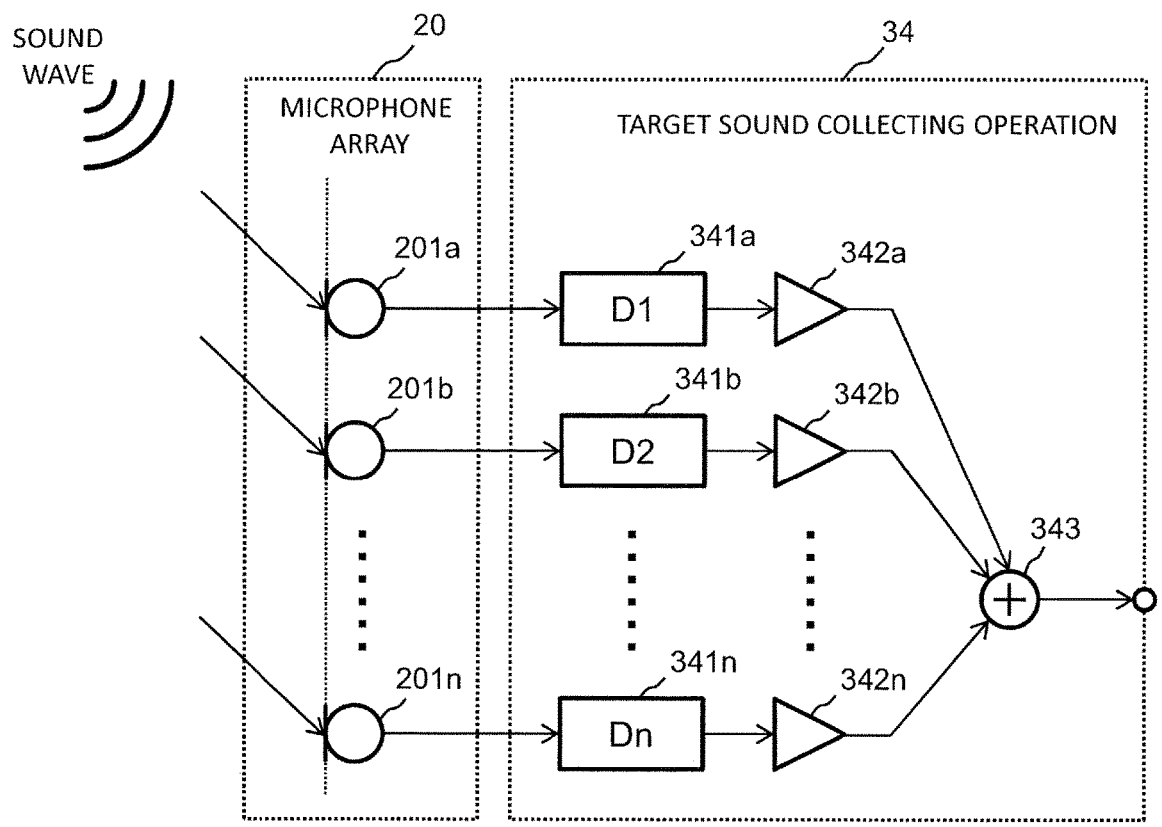
FIG. 20 is an explanatory diagram of an example of beam-forming of the third embodiment.

FIG. 20 depicts one example of the configurations of the microphone array 20 and the target sound collecting operation 34 in the third embodiment. In this embodiment, the microphone array 20 includes three or more microphones 201a to 201n. As depicted in FIG. 20, the target sound collecting operation 34 has the configuration of, a what-is-called delay sum beam-forming that includes plural delay instruments 341a to 341n, plural filters 342a to 342n, and an adder 343. The plural delay instruments 341a to 341n delay an input acoustic signal respectively by delay amounts D1 to Dn that correspond to the range from a horizontal angle "$\theta$c$-\alpha$" to a horizontal angle "$\theta$c$+\alpha$" in the horizontal direction, and by delay amounts D1 to Dn that correspond to the range from a vertical angle "$\phi$c$-\beta$" to "$\phi$c$+\beta$" in the vertical direction, and output the delayed acoustic signals. The beam width can optionally be varied by appropriately varying each of the delay amounts D1 to Dn such that the angle $\alpha$ and the angle $\beta$ are varied in accordance with the distance from the microphone array 20 to the target sound source. The beam width does not need to be a width that centers the horizontal angle $\theta$c and the vertical angle $\phi$c of the determined sound collection direction.

As above, the sound source estimating operation 32 may calculate the sound source probability Ps$(\theta,\phi)$ from the acoustic signal and may produce the sound source position information by varying the sound source probability based on the distance information. The direction determining operation 33 may also vary the degree of priority of each of the object position information and the sound source position information at the time of the determination of the sound collection direction, based on the distance information. The target sound collecting operation 34 may also vary the beam width that includes the sound collection direction based on the distance information. As above, more highly precise target sound can be acquired by controlling the sound collection in accordance with the distance from the camera 10 to the marker 70, that is, from the microphone array 20 to the target sound source.

Other Embodiments

The first to the third embodiments have been described as above as exemplification of the technique disclosed in this application. The technique in this disclosure is however not limited to this and is also applicable to embodiments to which modifications, replacements, additions, omission, and the like are appropriately made. A new embodiment can also be established by combining the constituent elements with each other that are described in the first to the third embodiments. Other embodiments will be exemplified below.

Figure 21:
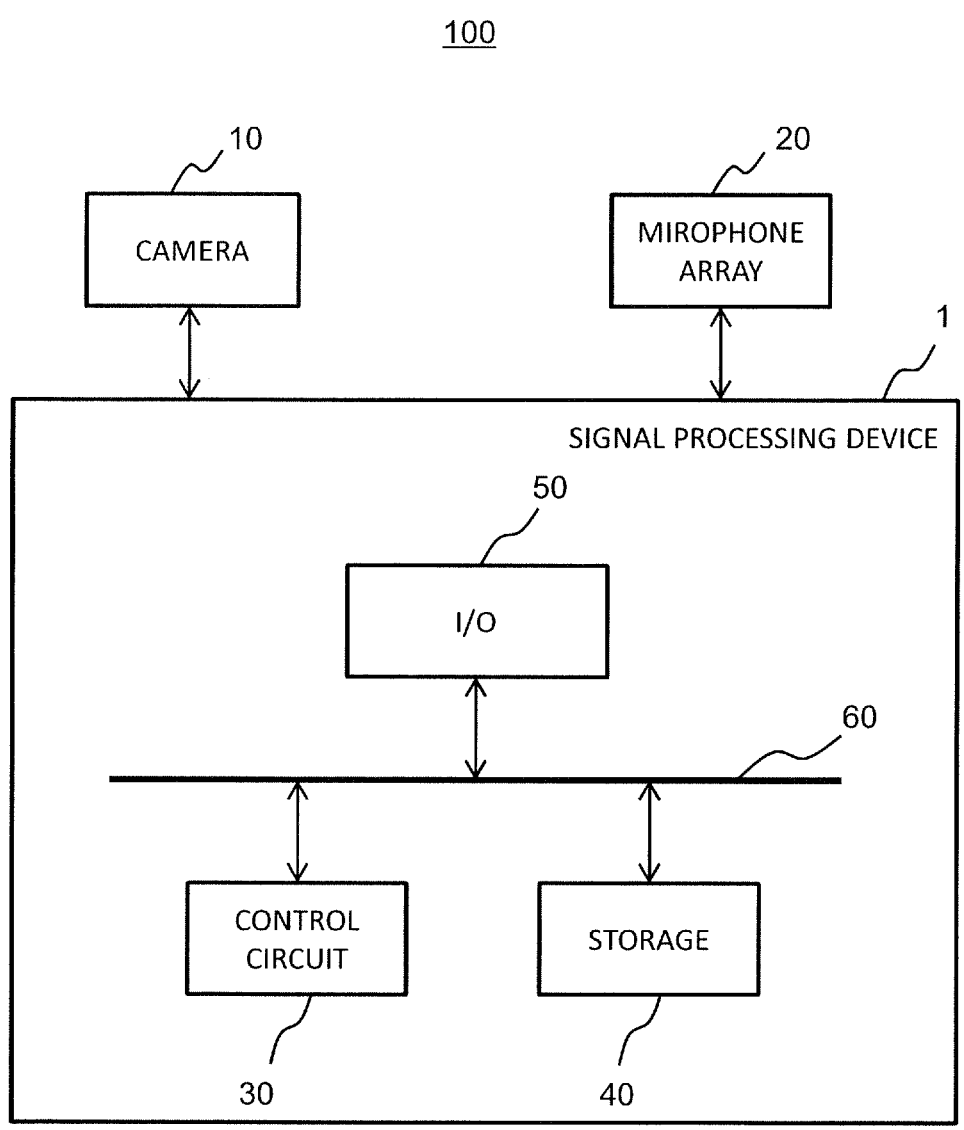
FIG. 21 is a block diagram depicting the configuration of a signal processing device in another embodiment.

The signal processing device 1 does not need to include either one or both of the camera 10 and the microphone array 20. For example, as depicted in FIG. 21, the signal processing device 1 may electrically be connected to an external camera 10 and an external microphone array 20. The signal processing device 1 may be an electronic instrument such as a smartphone including the camera 10 and may electrically and mechanically be connected to an external instrument that includes the microphone array 20. When the input and output interface device 50 receives the image data from the camera 10 externally attached to the signal processing device 1, the input and output interface device 50 corresponds to the input device for the image data. When the input and output interface device 50 receives the acoustic signal from the microphone array 20 externally attached to the signal processing device 1, the input and output interface device 50 corresponds to the input device for the acoustic signal.

The target sound correcting operation 36 corrects the target sound based on the distance from the microphone array 20 to the target sound source in the above embodiments while the signal processing device 1 does not need to include the target sound correcting operation 36. In this case, the sound collection control operation 300 may only control the sound collection based on the distance from the camera 10 to the marker 70. For example, a configuration may be employed according to which at least any one of the sound source estimating operation 32, the direction determining operation 33, and the target sound collecting operation 34 uses the distance information that indicates the distance from the camera 10 to the marker 70.

In the above embodiments, the control circuit 30 determines the sound collection direction based on both of the image data acquired from the camera 10 and the acoustic signal acquired from the microphone array 20. The determination of the sound collection direction may however be executed based only on the image data. In this case, the control circuit 30 does not need to include the sound source estimating operation 32. The determination of the sound collection direction may be executed based only on the acoustic signal and, in this case, the control circuit 30 does not need to include the target detecting operation 31. For example, in a sound collection environment as depicted in FIG. 3, in the case where only one person is present even with the presence of the noise source 120, the sound collection direction may be determined based only on the image data. For example, in the case where plural persons are present and the noise source 120 is absent, the sound collection direction may be determined based only on the acoustic signal.

The case where the horizontal angle $\theta c$ and the vertical angle $\phi c$ are each determined as the sound collection direction has been described in the above embodiments while at least any one of the horizontal angle $\theta c$ and the vertical angle $\phi c$ only has to be determined in the case where the direction of the target sound source can be identified based only on at least any one of the horizontal angle $\theta c$ and the vertical angle $\phi c$.

The above processing using the marker information 41 may also be realized using a learned model that learns to detect the marker from the input image utilizing machine learning such as deep learning.

The example where the face of a person is detected has been described in the above embodiments while, in the case where a sound of a person is collected, the target is not limited to the face of a person and only has to be a portion recognizable as that of a person. For example, the target may be the body or the lips of a person.

In the above embodiments, for example, in the case where plural target sound sources are present, the beam width may be adjusted in accordance with the horizontal angle $\theta c$ and the vertical angle $\phi c$ that are the sound collection directions of each of the plural target sound sources.

A sound of a person is collected as the target sound in the above embodiments while the target sound is not limited to the sound of a person. For example, the target sound may be a sound of a car, an animal call, or an operation sound of equipment in a plant. For example, in the case where the target sound is an operation sound of a motor, using a signal of the target sound acquired by the signal processing device 1, highly precise determination is enabled as to whether the operation sound of the motor is normal or abnormal.

Overview of Embodiments (1) The signal processing device of this disclosure is a signal processing device that collects a target sound output from an object to be a sound source, and includes an interface device that receives image data produced by a camera and an acoustic signal output from a microphone array, and a control circuit that controls a sound collection direction of the acoustic signal in at least any one of a horizontal direction and a vertical direction relative to the microphone array based on at least any one of the image data and the acoustic signal, and the control circuit includes a distance estimating operation that detects a predetermined marker attached to the object from the image data, that estimates the distance from the microphone array to the sound source based on the detected marker, and that outputs distance information indicating the estimated distance, and a target sound correcting operation that corrects the target sound based on the distance information.

A highly precise target sound can thereby be acquired.

(2) In the signal processing device of (1), the marker may have a predetermined size and the distance estimating operation may estimate the distance from the microphone array to the sound source by calculating the distance from the camera to the marker based on the image size of the marker in the image data.

The distance from the microphone array to the sound source can thereby be highly precisely estimated.

(3) In the signal processing device of (1), the marker may include attribute information that distinguishes an attribute of the sound source, the control circuit may further include an attribute acquiring operation that acquires the attribute information from the image data, and the target sound correcting operation may correct the target sound based on the distance information and the attribute information.

A highly precise target sound can thereby be acquired.

(4) In the signal processing device of (1), the control circuit may include an target detecting operation that detects the position of the object based on the image data and that outputs object position information indicating the detected position of the object, a sound source estimating operation that estimates the position of the sound source based on the acoustic signal and that outputs sound source position information indicating the estimated position of the sound source, a direction determining operation that determines the sound collection direction based on the object position information and the sound source position information, and a beam-forming unit that sets a beam form such that the target sound is extracted from the acoustic signal, based on the sound collection direction.

(5) In the signal processing device of (4), the sound source estimating operation may calculate the presence probability of the sound source in at least one of the horizontal direction and the vertical direction from the acoustic signal and may produce sound source position information by varying the presence probability of the sound source based on the distance information.

(6) In the signal processing device of (4), the direction determining operation may vary the degree of priority of each of the object position information and the sound source position information at the time of the determination of the sound collection direction, based on the distance information.

(7) In the signal processing device of (4), the beam-forming unit may vary the beam width including the sound collection direction based on the distance information.

(8) The signal processing device of (1) may include at least one of the camera and the microphone array.

(9) The signal processing device of this disclosure is a signal processing device that collects a target sound output from an object to be a sound source, and includes an input device that inputs image data produced by a camera and an acoustic signal output from a microphone array, and a control circuit that controls a sound collection direction of the acoustic signal in at least any one of a horizontal direction and a vertical direction relative to the microphone array based on at least any one of the image data and the acoustic signal, and the control circuit includes an target detecting operation that detects the position of the object based on the image data and that outputs object position information indicating the detected position of the object, a sound source estimating operation that estimates the position of the sound source based on the acoustic signal and that outputs sound source position information indicating the estimated position of the sound source, and a distance estimating operation that detects a predetermined marker attached to the object from the image data, that estimates the distance from the microphone array to the sound source based on the detected marker, and that outputs distance information indicating the estimated distance, and controls the collection of the target sound based on the object position information, the sound source position information, and the distance information.

(10) The signal processing method of this disclosure is a signal processing method of collecting a target sound output from an object to be a sound source by a signal processing device, and includes a step of inputting image data produced by a camera and an acoustic signal output from a microphone array, a step of detecting a predetermined marker attached to the object in the image data and estimating the distance from the microphone array to the sound source based on the detected marker, a step of determining a sound collection direction of the acoustic signal in at least any one of a horizontal direction and a vertical direction relative to the microphone array based on at least any one of the image data and the acoustic signal, a step of setting a beam form such that the target sound is extracted from the acoustic signal based on the sound collection direction, and a step of correcting the target sound based on the estimated distance.

A highly precise target sound can thereby be acquired.

The signal processing device and the signal processing method described in this disclosure are each realized by cooperation of hardware resources such as, for example, a processor and a memory, and a program with each other, and the like.

The signal processing device of this disclosure is useful as, for example, a device that collects a sound of a person during a conversation.

What is claimed is:

1. A signal processing device that collects a target sound output from an object to be a sound source, the signal processing device comprising:
    an interface device that receives image data produced by a camera and an acoustic signal output from a microphone array; and
    a control circuit that controls a sound collection direction of the acoustic signal in at least any one of a horizontal direction and a vertical direction relative to the microphone array based on at least any one of the image data and the acoustic signal,
    wherein the control circuit:
        detects a predetermined marker attached to the object from the image data;
        estimates a distance from the microphone array to the sound source based on the detected marker; and
        corrects the target sound based on distance information indicating the estimated distance.

2. The signal processing device according to claim 1, wherein
    the marker has a predetermined size, and
    the control circuits estimates the distance from the microphone array to the sound source by calculating a distance from the camera to the marker based on the image size of the marker in the image data.

3. The signal processing device according to claim 1, wherein
    the marker has attribute information that distinguishes an attribute of the sound source,
    wherein the control circuit:
        acquires the attribute information from the image data; and
        corrects the target sound based on the distance information and the attribute information.

4. The signal processing device according to claim 1, wherein
    wherein the control circuit:
        detects a position of the object based on the image data;
        estimates a position of the sound source based on the acoustic signal,
        determines the sound collection direction based on object position information that indicates the detected position of the object and the sound source position information that indicates the estimated position of the sound source; and
        sets a beam form such that the target sound is extracted from the acoustic signal, based on the sound collection direction.

5. The signal processing device according to claim 4, wherein the control circuit:
calculates a presence probability of the sound source in at least one of the horizontal direction and the vertical direction from the acoustic signal; and
produces sound source position information by varying the presence probability of the sound source based on the distance information.

6. The signal processing device according to claim 4, wherein the control circuit varies a degree of priority of each of the object position information and the sound source position information at a time of the determination of the sound collection direction, based on the distance information.

7. The signal processing device according to claim 4, wherein the control circuit varies a beam width that comprises the sound collection direction based on the distance information.

8. The signal processing device according to claim 1, further comprising at least one of:
the camera; and
the microphone array.

9. A signal processing device that collects a target sound output from an object to be a sound source, the signal processing device comprising:
an communication circuit that inputs image data produced by a camera and an acoustic signal output from a microphone array, and
a control circuit that controls a sound collection direction of the acoustic signal in at least any one of a horizontal direction and a vertical direction relative to the microphone array based on at least any one of the image data and the acoustic signal,
wherein the control circuit:
detects a position of the object based on the image data;
estimates a position of the sound source based on the acoustic signal;
detects a predetermined marker attached to the object from the image data;
estimates a distance from the microphone array to the sound source based on the detected marker;
controls the collection of the target sound based on object position information that indicates the detected position of the object, sound source position information that indicates the estimated position of the sound source, and distance information that indicates the estimated distance.

10. A signal processing method of collecting a target sound output from an object to be a sound source by a signal processing device, the signal processing method comprising:
a step of inputting image data produced by a camera and an acoustic signal output from a microphone array;
a step of detecting a predetermined marker attached to the object in the image data to estimate a distance from the microphone array to the sound source based on the detected marker;
a step of determining a sound collection direction of the acoustic signal in at least any one of a horizontal direction and a vertical direction relative to the microphone array based on at least any one of the image data and the acoustic signal;
a step of setting a beam form such that the target sound is extracted from the acoustic signal, based on the sound collection direction; and
a step of correcting the target sound based on the estimated distance.

* * * * *